(12) United States Patent
Nishibe et al.

(10) Patent No.: US 11,386,626 B2
(45) Date of Patent: *Jul. 12, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Mitsuru Nishibe, Chiba (JP); Tsuyoshi Ishikawa, Kanagawa (JP); Hirotake Ichikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,172

(22) Filed: Nov. 6, 2020

(65) Prior Publication Data
US 2021/0056765 A1 Feb. 25, 2021

Related U.S. Application Data

(63) Continuation of application No. 15/577,113, filed as application No. PCT/JP2016/056666 on Mar. 3, 2016, now Pat. No. 10,832,479.

(30) Foreign Application Priority Data

Jun. 15, 2015 (JP) ................................ 2015-120186

(51) Int. Cl.
*G06T 19/00* (2011.01)
*G06F 3/01* (2006.01)
(Continued)

(52) U.S. Cl.
CPC ............ *G06T 19/006* (2013.01); *G06F 1/163* (2013.01); *G06F 3/011* (2013.01); *G06F 3/013* (2013.01);
(Continued)

(58) Field of Classification Search
None
See application file for complete search history.

(56) References Cited

U.S. PATENT DOCUMENTS

2013/0182012 A1* 7/2013 Kim ...................... G06T 19/006
345/633
2014/0333666 A1 11/2014 Poulos et al.
(Continued)

FOREIGN PATENT DOCUMENTS

JP 2012-221249 A 11/2012
JP 2014-518596 A 7/2014
(Continued)

*Primary Examiner* — Jwalant Amin
(74) *Attorney, Agent, or Firm* — Paratus Law Group, PLLC

(57) ABSTRACT

There is provided an information processing apparatus, an information processing method, and a program capable of further diversifying a method of implementing a virtual object using the AR technology, the information processing apparatus including: a display control unit configured to perform a first process of displaying a virtual object superimposed on a real space at a position which is based on a real object detected in the real space or a second process of displaying the virtual object superimposed on the real space at a position which is not based on the real object detected in the real space.

11 Claims, 19 Drawing Sheets

(51) Int. Cl.
*G06F 1/16* (2006.01)
*G06F 3/04842* (2022.01)
*G06T 19/20* (2011.01)

(52) U.S. Cl.
CPC .......... *G06F 3/017* (2013.01); *G06F 3/04842* (2013.01); *G06T 19/20* (2013.01)

(56) References Cited

U.S. PATENT DOCUMENTS

| | | |
|---|---|---|
| 2015/0032823 A1 | 1/2015 | Miller |
| 2015/0293644 A1 | 10/2015 | Watanabe et al. |
| 2016/0026253 A1 | 1/2016 | Bradski et al. |

FOREIGN PATENT DOCUMENTS

| | | |
|---|---|---|
| JP | 2015-503141 A | 1/2015 |
| WO | WO 2013/085639 A1 | 6/2013 |
| WO | WO 2014/162823 A1 | 10/2014 |
| WO | WO 2014/181380 A1 | 11/2014 |

\* cited by examiner

FIG. 12

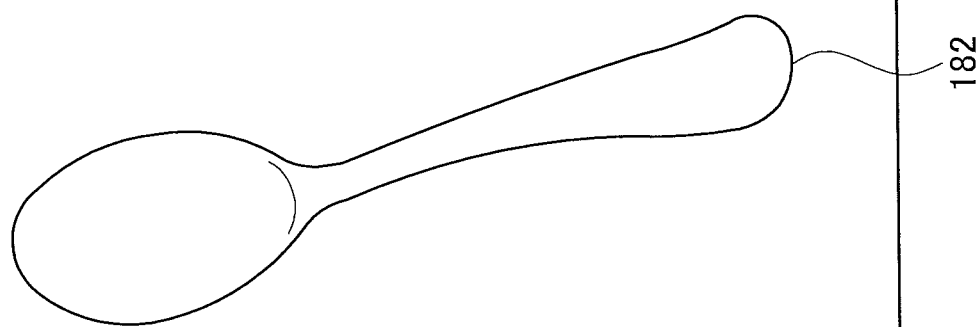

The Address by Abraham Lincoln in Gettysburg, Pennsylvania on November 19 in 1863
Four score and seven years ago our fathers brought forth, on this continent, a new nation, conceived in Liberty, and dedicated to the proposition that all men are created equal.
Now we are engaged in a great civil war, testing whether that nation, or any nation so conceived and so dedicated, can long endure. We are met on a great battle-field of that war. We have come to dedicate a portion of that field, as a final resting place for those who here gave their lives that that nation might live. It is altogether fitting and proper that we should do this.
But, in a larger sense, we can not dedicate — we can not consecrate — we can not hallow — this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us — that from these honored dead we take increased devotion to that cause for which they here gave the last full measure of devotion — that we here highly resolve that these dead shall not have died in vain — that this nation, under God, shall have a new birth of freedom — and that government of the people, by the people, for the people, shall not perish from the earth.

FIG. 13
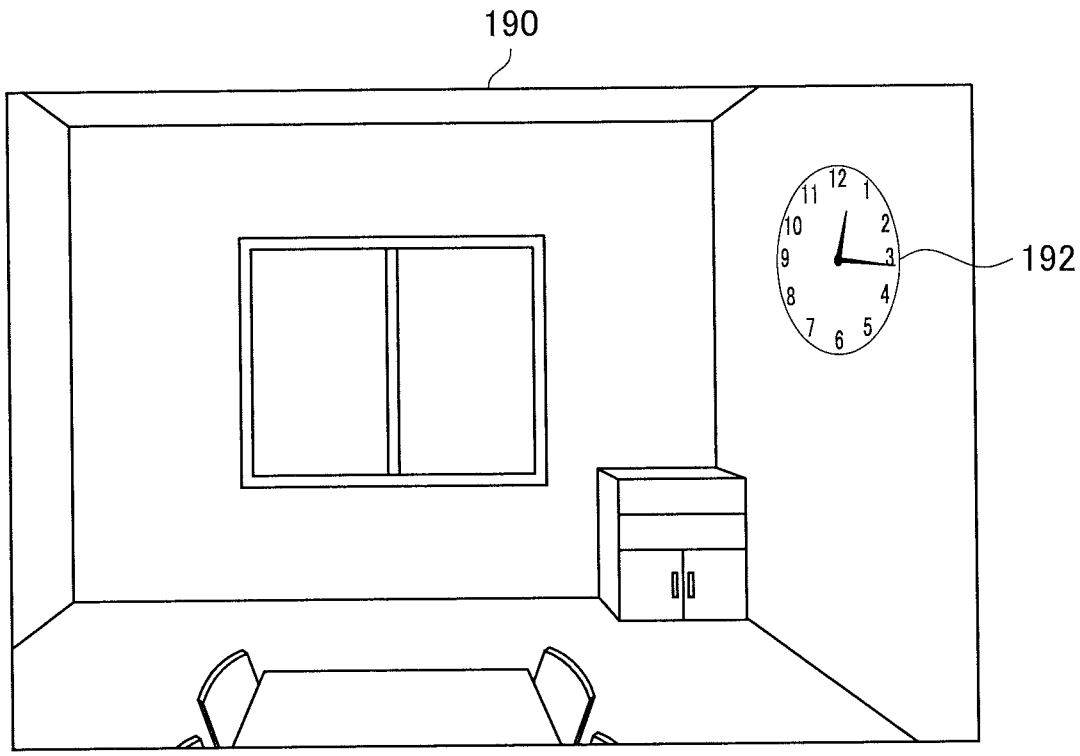
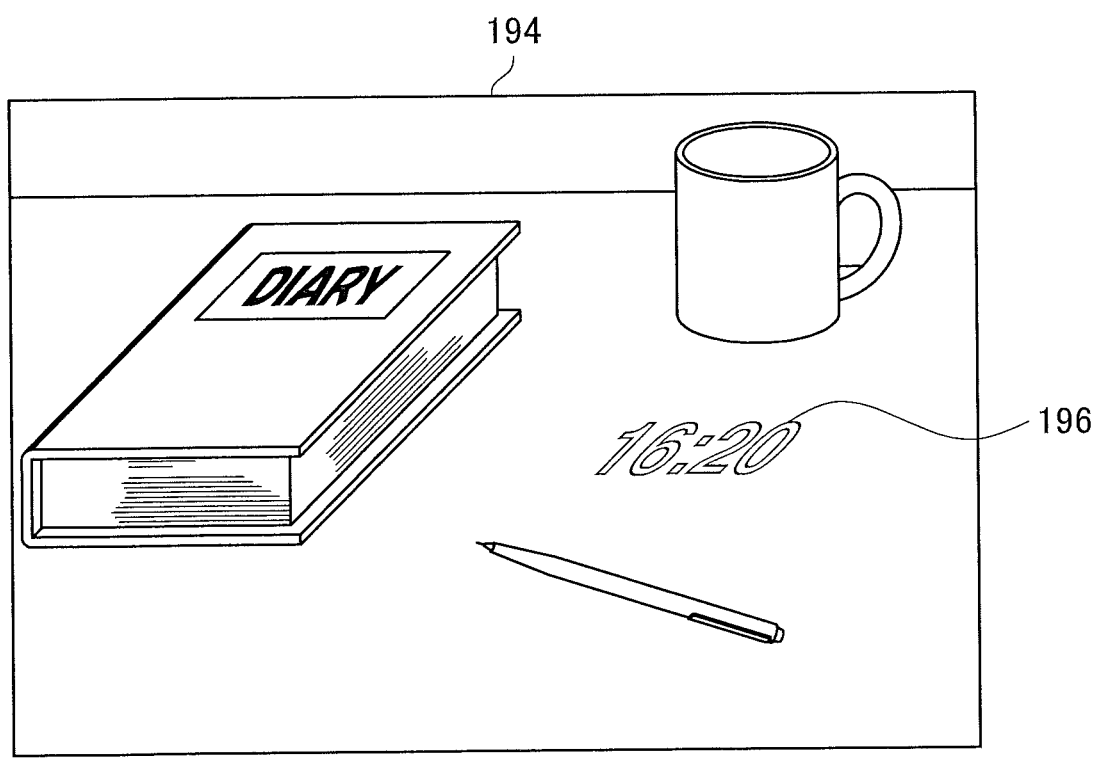

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 15/577,113 (filed on Nov. 27, 2017), which is a National Stage Patent Application of PCT International Patent Application No. PCT/JP2016/056666 (filed on Mar. 3, 2016) under 35 U.S.C. § 371, which claims priority to Japanese Patent Application No. 2015-120186 (filed on Jun. 15, 2015), which are all hereby incorporated by reference in their entirety.

TECHNICAL FIELD

The present disclosure relates to an information processing apparatus, an information processing method, and a program.

BACKGROUND ART

In recent years, technology called augmented reality (AR) that presents a user with additional information superimposed on the real world has attracted public attention. In the AR technology, information presented to the user is also called annotation and can be visualized using various forms of virtual objects such as text, icons, or animation. For example, a technique in which a virtual object of the AR is displayed in association with a real object, for example, a virtual object is displayed on a surface of a real object, or a virtual object is caused to float above a real object and be displayed is disclosed in Patent Literature 1.

CITATION LIST

Patent Literature

Patent Literature 1: WO 2014/162823

DISCLOSURE OF INVENTION

Technical Problem

It has not been long since the AR technology proposed in the Patent Literature 1 or the like was developed, and it is difficult to say that techniques for utilizing the AR in various situations have been sufficiently proposed. For example, diversification of a method of implementing a virtual object using the AR technology is also one of techniques which are not sufficiently proposed.

In this regard, the present disclosure proposes an information processing apparatus, an information processing method, and a program, which are novel and improved and capable of further diversifying a method of implementing a virtual object using the AR technology.

Solution to Problem

According to the present disclosure, there is provided an information processing apparatus including: a display control unit configured to perform a first process of displaying a virtual object superimposed on a real space at a position which is based on a real object detected in the real space or a second process of displaying the virtual object superimposed on the real space at a position which is not based on the real object detected in the real space.

Further, according to the present disclosure, there is provided an information processing method including: performing, by a processor, a first process of displaying a virtual object superimposed on a real space at a position which is based on a real object detected in the real space or a second process of displaying the virtual object superimposed on the real space at a position which is not based on the real object detected in the real space.

Further, according to the present disclosure, there is provided a program causing a computer to function as: a display control unit configured to perform a first process of displaying a virtual object superimposed on a real space at a position which is based on a real object detected in the real space or a second process of displaying the virtual object superimposed on the real space at a position which is not based on the real object detected in the real space.

Advantageous Effects of Invention

As described above, according to the present disclosure, it is possible to further diversify methods of implementing a virtual object using the AR technology. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12 is a diagram for describing a display example of a virtual object according to the present embodiment.

FIG. 13 is a diagram for describing a display example of a virtual object according to the present embodiment.

MODE(S) FOR CARRYING OUT THE INVENTION

Figure 1:
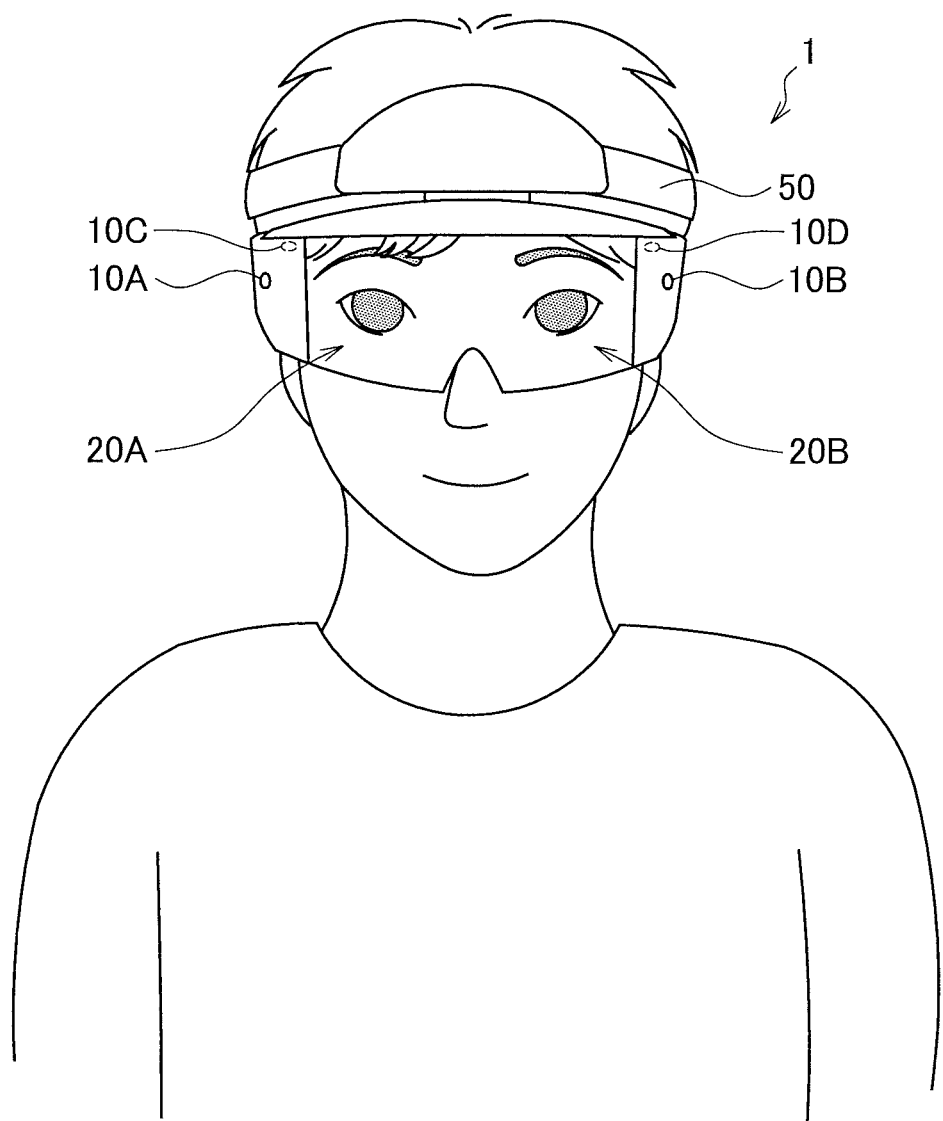
FIG. 1 is a diagram illustrating an example of an external configuration of a display device according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, there are cases in the present specification and the diagrams in which constituent elements having substantially the same functional configuration are distinguished from each other by affixing different letters to the same reference numbers. For example, a plurality of constituent elements having substantially the same functional configuration are distinguished, like imaging units 10A and 10B, if necessary. However, when there is no particular need to distinguish a plurality of constituent elements having substantially the same functional configuration from each other, only the same reference number is affixed thereto. For example, when there is no particular need to distinguish imaging units 10A and 10B, they are referred to simply as imaging units 10.

The description will proceed in the following order.
1. Configuration example
1.1. External configuration example
1.2. Internal configuration example
2. Technical features
2.1. Overview of process
2.2. Variation of display process
2.3. Display region setting criteria
2.4. Display control based on interaction
2.5. Processing according to display region
2.6. Display control according to user
2.7. Other display control
3. Operation process example
4. Hardware configuration example
5. Conclusion

1. CONFIGURATION EXAMPLE

1.1. External Configuration Example

First, an example of an external configuration of an information processing apparatus according to one embodiment of the present disclosure will be described with reference to FIG. 1.

FIG. 1 is a diagram illustrating an example of an external configuration of a display device 1 according to the present embodiment. The display device 1 illustrated in FIG. 1 is a device also called smart glasses or a head mounted display (HMD). The display device 1 including a mounting unit 50 of a frame structure that surrounds, for example, the head of the user and is fixed to the head of the user through the mounting unit 50. The display device 1 has a configuration in which a pair of display units 20A and 20B for the left eye and the right eye are arranged in front of the eyes of the user in the mounted state illustrated in FIG. 1. For example, a transmissive type display is used as the display unit 20, and the display device 1 is able to enter a through state, that is, a transparent or semi-transparent state, by controlling transmittance of the transmissive type display. When the display unit 20 is in the through state, there is no difficulty in normal life even if the user constantly wears the display device 1 as with glasses.

The display unit 20 is able to display a virtual object of the AR superimposed on the landscape of a real space by displaying images such as text or drawings in the transparent or semi-transparent state. In other words, the display device 1 may be implemented as a transmissive type HMD. Note that, in the transmissive type HMD, preferably, the display device 1 is fixed to the head of the user through the mounting unit 50, and a relative positional relation between the two eyes of the user and the display unit 20 is fixed as illustrated in FIG. 1. This is because if the relative positional relation changes, a position on the display for displaying the virtual object may change.

Further, the display unit 20 is also able to display the virtual object superimposed on captured images of the real space captured by imaging units 10A and 10B while displaying the captured images of the real space. The display unit 20 is also able to display the virtual object superimposed on the image of the virtual space while displaying images similar to images obtained by imaging the virtual space through the imaging units 10A and 10B. In other words, the display device 1 may be implemented as an immersive (video through type) HMD.

Alternatively, the display unit 20 may be implemented as an LED light source or the like that projects an image directly onto the retina of the user. In other words, the display device 1 may be implemented as a projection type HMD.

Various types of content may be displayed on the display unit 20 as the virtual object. For example, content may be data such as moving image content including a movie or a video clip, still image content imaged by a digital still camera or the like, an electronic hook, or the like. Further, such content may all be data to be displayed such as computer use data such as image data, text data, or spreadsheet data which is generated by the user using a personal computer or the like, a game image based on a game program, or the like The imaging units 10A and 10B are arranged to perform imaging using a real space in a direction in which the user views as an imaging range in a state in which the user wears the display device 1. Each of the imaging units 10A and 10B may be implemented as a stereo camera capable of acquiring information indicating a distance in a direction in which the user views (hereinafter also referred to as "depth information"). In a case in which each of the imaging units 10A and 10B is implemented as a stereo camera, the display device 1 is able to recognize a shape and a posture of the real object in the real space with a high degree of accuracy. Hereinafter, each of the imaging units 10A and 10B is also referred to as an "outward facing stereo camera 10."

On the other hand, imaging units 10C and 10D are arranged to perform imaging using the direction of the user, more specifically, both eyes of the user, as the imaging range in the state in which the user wears the display device 1.

Each of the imaging units 10C and 10D may be implemented as a stereo camera capable of acquiring the depth information in the direction of both eyes of the user. In a case in which each of the imaging units 10C and 10D is implemented as a stereo camera, the display device 1 is able to recognize an eyeball position, a pupil position, a line-of-sight direction, or the like of the user with a high degree of accuracy. Hereinafter, each of the imaging units 10C and 10D is also referred to as an "inward facing stereo camera 10."

Further, although not illustrated in FIG. 1, the display device 1 may have a speaker or an earphone speaker. Further, the display device 1 may include a microphone for acquiring an external sound.

The external appearance of the display device 1 illustrated in FIG. 1 is an example, and various structures in which the user wears the display device 1 can be considered. The display device 1 may be constituted by a mounting unit which is generally considered to be of an eyeglass type or head mounted type, and at least in this embodiment, it is sufficient that the display unit 20 is arranged close to the eyes of the user. Further, the display unit 20 may be configured such that a pair of units corresponding to both eyes are disposed or a single unit corresponding to one eye may be disposed.

Similarly, two speakers or two earphone speakers corresponding to the left and right ears may be disposed, or one speaker or one earphone speaker corresponding to one ear may be disposed. Further, one or more microphones may be disposed, and this arrangement is arbitrary.

The example of the external configuration of the display device 1 according to the present embodiment has been described above. Next, an example of an internal configuration of the display device 1 according to the present embodiment will be described with reference to FIG. 2.

Note that, in the following description, as an example, the display device 1 is assumed to be implemented as a transmissive type HMD. Hereinafter, an image displayed on the display unit 20 (transmission type display) of the display device 1 (including a transparently visible background and a superimposedly displayed virtual object) is also referred to as a "real space image."

1.2. Internal Configuration Example

Figure 2:
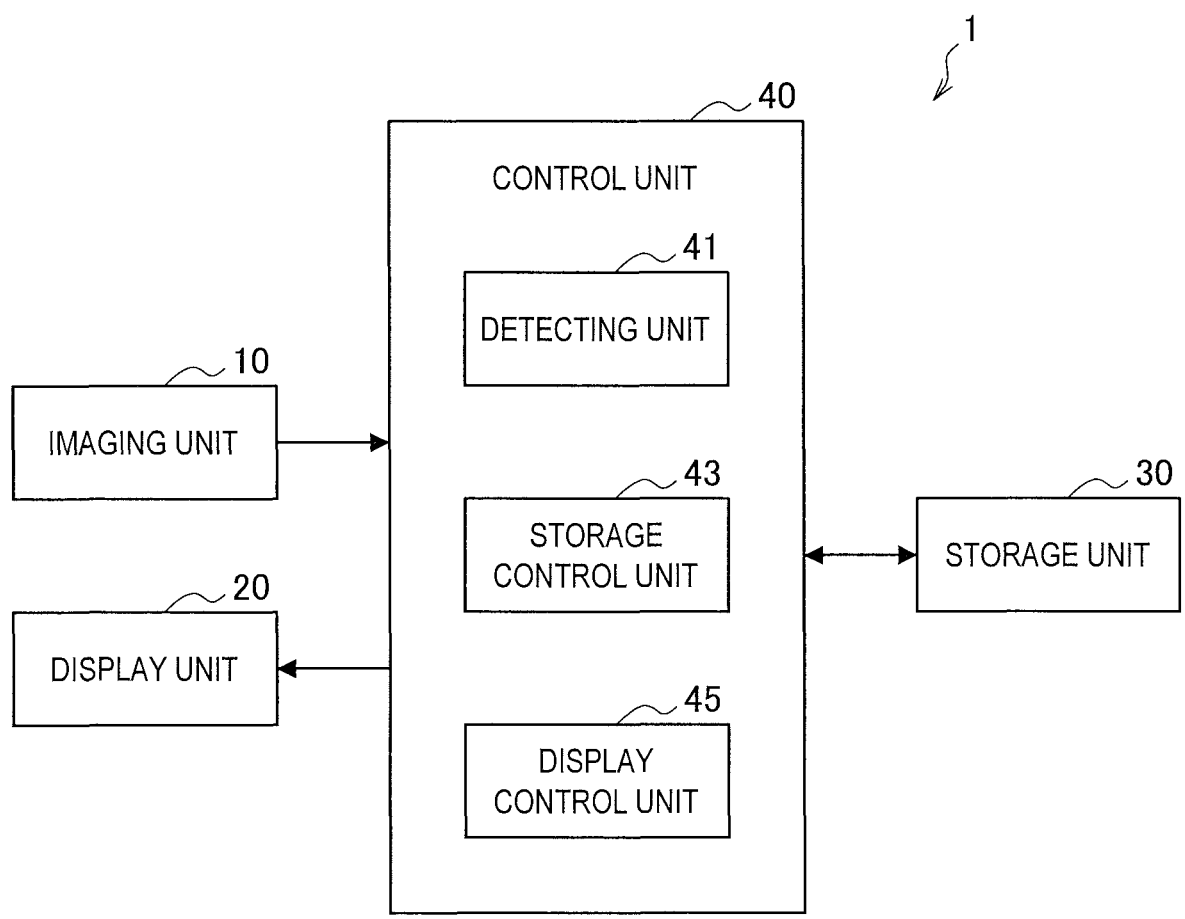
FIG. 2 is a block diagram illustrating an example of an internal configuration of a display device according to the present embodiment.

FIG. 2 is a block diagram illustrating an example of an internal configuration of the display device 1 according to the present embodiment. As illustrated in FIG. 2, the display device 1 includes an imaging unit 10, the display unit 20, a storage unit 30, and a control unit 40.

The imaging unit 10 has a function of imaging the real space and outputting a captured image. For example, the imaging unit 10 is able to be implemented as the outward facing stereo camera 10 and the inward facing stereo camera 10 illustrated in FIG. 1.

The display unit 20 has a function of displaying an image. For example, the display unit 20 may be implemented as a transmissive display arranged at both eyes of the user illustrated in FIG. 1.

The storage unit 30 has a function of storing various information. For example, the storage unit 30 stores information related to the virtual object displayed on the display unit 20. For example, the storage unit 30 stores content such as an image or text serving as a source of the virtual object.

The control unit 40 functions as an operation processing device and a control device and has a function of controlling an overall operation of the display device 1 according to various kinds of programs. The control unit 40 is implemented by an electronic circuit such as a central processing unit (CPU), a microprocessor, or the like. Note that the control unit 40 may include a read only memory (ROM) that stores programs, operation parameters, and the like to be used and a random access memory (RAM) that temporarily stores parameters which appropriately change and the like. Further, the control unit 40 may include a graphics processing unit (GPU) and a video RAM (VRAM) for image processing, and the like.

As illustrated in FIG. 2, the control unit 40 functions as a detecting unit 41, a storage control unit 43, and a display control unit 45, The detecting unit 41 has a function of detecting various kinds of information from the captured image output from the imaging unit 10. The storage control unit 43 has a function of storing information in the storage unit 30 and acquiring information stored in the storage unit 30. The display control unit 45 has a function of performing display control for causing images to be displayed on the display unit 20. Specifically, the display control unit 45 controls the display unit 20 such that the virtual object is displayed superimposed on the real space (hereinafter, this is also described as "the display device 1 superimposedly displays the virtual object"), The example of the internal configuration of the display device 1 according to the present embodiment has been described above.

2. TECHNICAL FEATURES

Next, technical features of the display device 1 according to the present embodiment will be described in order.

2.1. Overview of Process

Figure 3:
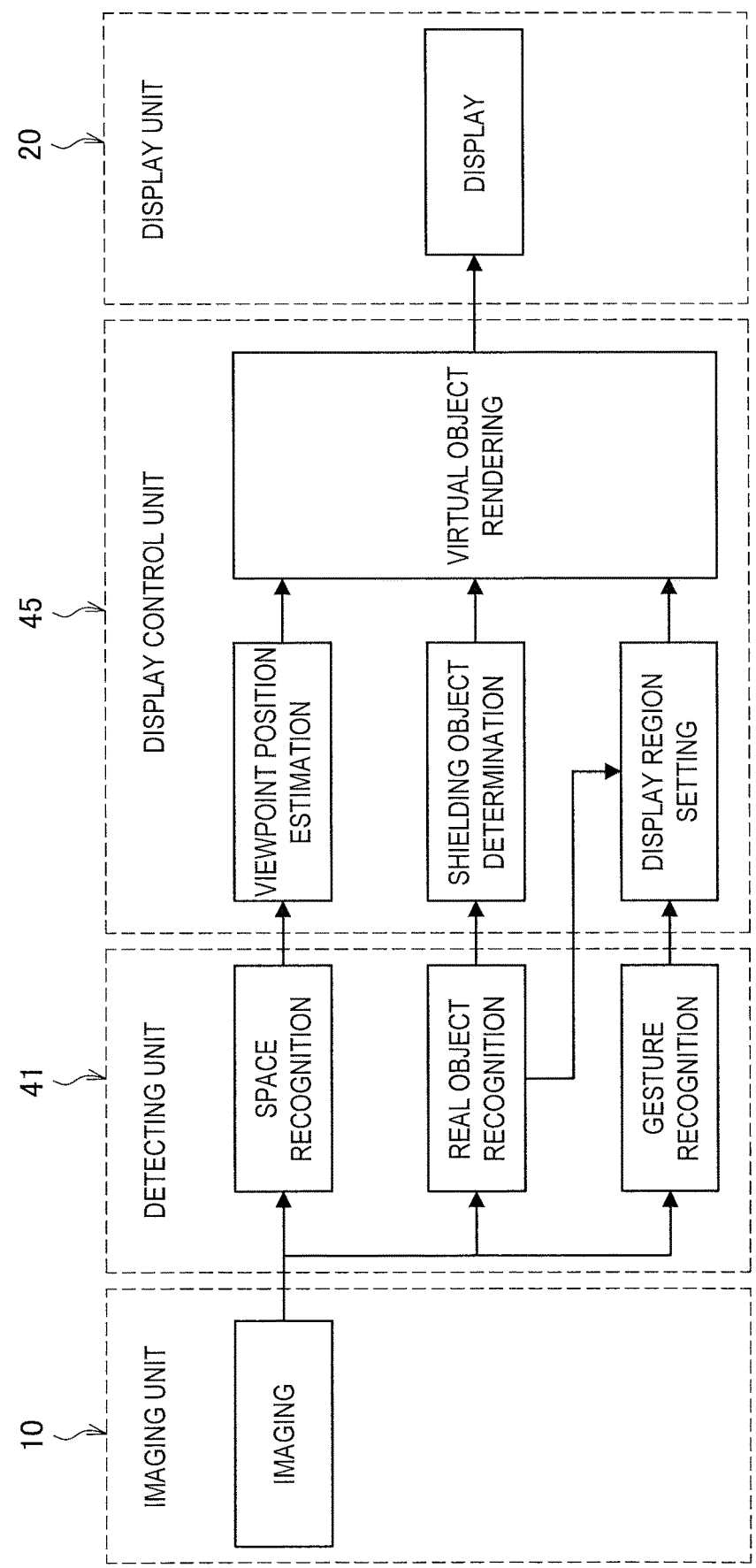
FIG. 3 is a diagram illustrating an overview of a process executed in a display device according to the present embodiment.

First, an overview of a process performed in the display device 1 will be described with reference to FIG. 3. FIG. 3 is a diagram illustrating an overview of a process performed in the display device 1 according to the present embodiment.
(1) Imaging Process As illustrated in FIG. 3, the imaging unit 10 first performs an imaging process and acquires a captured image.
(2) Space Recognition Process Next, as illustrated in FIG. 3, the detecting unit 41 performs a space recognition process on the basis of the captured image output from the imaging unit 10. Spatial information indicating the position and the posture of the display device 1 in the real space is acquired through the space recognition process.

For example, the spatial information may be an environment recognition matrix recognized by a publicly known image recognition technique such as a structure from motion (SfM) technique or a simultaneous localization and mapping (SLAM) technique. For example, the environment recognition matrix indicates a relative position and a posture of a coordinate system of a reference environment (real space) relative to a device-specific coordinate system of the display device 1. For example, in a case in which the SLAM method is used, a state variable including a position, a posture, a velocity, and an angular velocity of a device and a position of at least one feature point included in a captured image is updated for each frame of a captured image on the basis of a principle of an extended Kalman filter. Accordingly, it is possible to recognize the position and posture of the reference environment based on the position and posture of the device using an input image input from a monocular camera. Note that, for detailed description of the SLAM technique, see, for example, "Real-Time Simultaneous Localization and Mapping with a Single Camera" (Andrew J. Davison, Proceedings of the 9th IEEE International Conference on Computer Vision Volume 2, 2003, pp. 1403-1410).

In addition, the spatial information may be any information as long as it indicates the relative position and the posture of the imaging unit in the real space. For example, the environment recognition matrix may be recognized on the basis of depth data obtained from a depth sensor that may be installed in the imaging unit. The environment recognition matrix may also be recognized on the basis of output data output from an environment recognition system such as an infrared ranging system or a motion capture system. An example of such a technique is described in, for example, S. Izadi, et al, KinectFusion: Real-time 3D Reconstruction and Interaction Using a Moving Depth Camera, ACM Symposium on User Interface Software and Technology, 2011, but the technique is not limited thereto, and various publicly known techniques may be used for generation of the spatial information.

Alternatively, the spatial information may be generated by specifying a relative positional relation of each frame image through a stitching analysis for a series of frame images obtained by imaging the real space. In this case, the stitching analysis may be two-dimensional stitching analysis of attaching frame images onto a base plane or three-dimensional stitching analysis of attaching frame images onto arbitrary positions in a space.

Further, the spatial information may be acquired using an inertial sensor such as an acceleration sensor or a gyro sensor included in the display device 1 together. In this case, the spatial information can be estimated at a higher speed. Further, it is possible to acquire the spatial information with a certain degree of accuracy even in a case in which it is difficult to acquire the spatial information on the basis of the captured image due to a motion blur or the like caused by fast movement of the user (camera position).

(3) Real Object Recognition Process

Further, as illustrated in FIG. 3, the detecting unit 41 performs a real object recognition process on the basis of the captured image output from the imaging unit 10. For example, a real object included in the real space image near the user who wears the display device 1 is detected through the real object recognition process. Specifically, real object information indicating a position and a shape of the real object, more accurately, a position and a shape of the real object in the real space image (that is, unevenness of the real space viewed from the imaging unit 10), is acquired through the real object recognition process.

For example, the real object information may be the depth information of each pixel and a degree of reliability of the depth information based on the image obtained by the stereo camera. For example, the detecting unit 41 acquires the real object information on the basis of a difference (a binocular parallax) in the real object in a plurality of captured images in which the same real space is an imaging target from different viewpoints. Note that, due to a characteristic of stereo image recognition, the degree of reliability of the depth information related to a region in which a change in a color tone or the like is small may be low. Further, the depth information may be acquired using an arbitrary technique such as a depth sensor of a time of flight (ToF) scheme.

Further, the real object information may be acquired by comparing a feature quantity calculated from the captured image output from the imaging unit 10 with a feature quantity of the real object stored in the storage unit 30 in advance. In this case, the real object information may include identification information of a target real object and information indicating a position and a posture thereof. For example, the feature quantity may be calculated by a publicly known feature quantity calculation technique such as a SIFT technique or a random ferns technique.

In addition, the real object information may be acquired by recognizing a known diagram or symbol, an artificial marker (for example, a bar code or a QR code (registered trademark)), or a natural marker.

(4) Gesture Recognition Process

Further, as illustrated in FIG. 3, the detecting unit 41 performs a gesture recognition process on the basis of the captured image output from the imaging unit 10. Gesture information indicating content of a gesture performed by the user wearing the display device 1 or another user nearby is acquired through the gesture recognition process. The gesture information may be acquired using, for example, a technique similar to that for the real object recognition process.

(5) Viewpoint Position Estimation Process

Next, as illustrated in FIG. 3, the display control unit 45 performs a viewpoint position estimation process. Viewpoint position information indicating a position of the eye of the user wearing the display device 1 is acquired through the viewpoint position estimation process. For example, the display control unit 45 estimates the viewpoint position information on the basis of the spatial information acquired through the space recognition process. The display control unit 45 may estimate the viewpoint position information further on the basis of the eyeball position, the pupil position, the line-of-sight direction, or the like of the user recognized from the image acquired by the inward facing stereo camera 10.

(6) Shielding Object Determination Process

Further, as illustrated in FIG. 3, the display control unit 45 performs a shielding object determination process. Shielding object information indicating overlapping of the real objects viewed by the user wearing the display device 1 is acquired through the shielding object determination process. For example, the display control unit 45 recognizes a positional relation between the real objects, a region which is invisible to the user due to overlapping, and the like on the basis of real object information.

(7) Display Region Setting Process

Further, as illustrated in FIG. 3, the display control unit 45 performs a process of setting a display region for the virtual object. A display region on which the virtual object is displayed (superimposed) is set in one region on the real space through the display region setting process.

For example, the display control unit 45 detects a plane region on the basis of the real object information. The plane region refers to a flat surface (having no or little unevenness) in the real object. Further, the display control unit 45 calculates, for example, an area, a normal line, a color, and a color variation degree of the plane region on the basis of the depth information and the captured image. Then, the display control unit 45 sets a region suitable for displaying the virtual object in the plane region as the display region. The display control unit 45 may set a plane region calculated on the basis of the depth information with a higher degree of reliability as the display region preferentially over the plane region calculated on the basis of the depth information with a lower degree of reliability. The display region may have various shapes such as a rectangle, a triangle, a polygon, or a circle. For example, the suitable region is a flat surface of the real object and indicates a surface having a sufficient area, and moreover, a small angle between a vector from the imaging unit 10 to a plane and a normal line of a plane (that is, a surface facing the user). Further, a suitable region may be a region whose color change is flat. As described above, when the display region is set in the region suitable for the display, collision between real world information and the virtual object is prevented or reduced.

On the other hand, the display control unit 45 may set, for example, an arbitrary region (for example, a region in the air) on the space other than the surface of the real object as the display region. For example, in a case in which there is no flat surface in the real object, in a case in which there is no surface having a sufficient area, or in a ease in which the angle between the vector from the imaging unit 10 to the plane and the normal line of the plane is large (that is, in a case in which it does not face the user, for example, a line-of-sight direction is substantially parallel to the plane), the display control unit 45 sets a region in the air as the display region.

Further, the display control unit 45 may set the display region on the basis of the gesture information. For example, the display control unit 45 enlarges, reduces, or moves the display region according to the instruction of the user.

The display control unit 45 lays out content in accordance with the set display region and renders the laid-out content into the texture of the virtual object.

(8) Virtual Object Rendering Process

Then, as illustrated in FIG. 3, the display control unit 45 performs a virtual object rendering process. For example, the display control unit 45 decides a viewpoint for rendering on the basis of the viewpoint position information and the spatial information. Specifically, the display control unit 45 performs projective transform of the display region set in the display region setting process into coordinates on the display unit 20 on the basis of the viewpoint position information and the spatial information. Hereinafter, the display region which has undergone the projective transform is also referred to simply as a "display region." Then, the display control unit 45 transforms the texture of the virtual object through the GPU and writes resulting information in a VRAM corresponding to the display region which has undergone the projective transform. Note that the display control unit 45 may cause a shielded portion of the virtual object to disappear on the basis of the shielding object information.

(9) Display Process

Finally, as illustrated in FIG. 3, the display unit 20 performs a display process. For example, the display unit 20 performs display based on pixel information read from the VRAM through a display controller (for example, the display control unit 45). Accordingly, the virtual object is displayed superimposed on the real space image.

2.2. Variation of Display Control Process

The display device 1 (for example, the display control unit 45) according to the present embodiment is able to simultaneously or selectively perform a plurality of types of superimposing processes. For example, the display device 1 is able to perform a first process of displaying the virtual object superimposed on the real space at a position which is based on the real object detected in the real space or a second process of displaying the virtual object superimposed on the real space at a position which is not based on the real object detected in the real space. Hereinafter, a variation of the display control process performed by the display device will be described with reference to FIG. 4.

Figure 4:
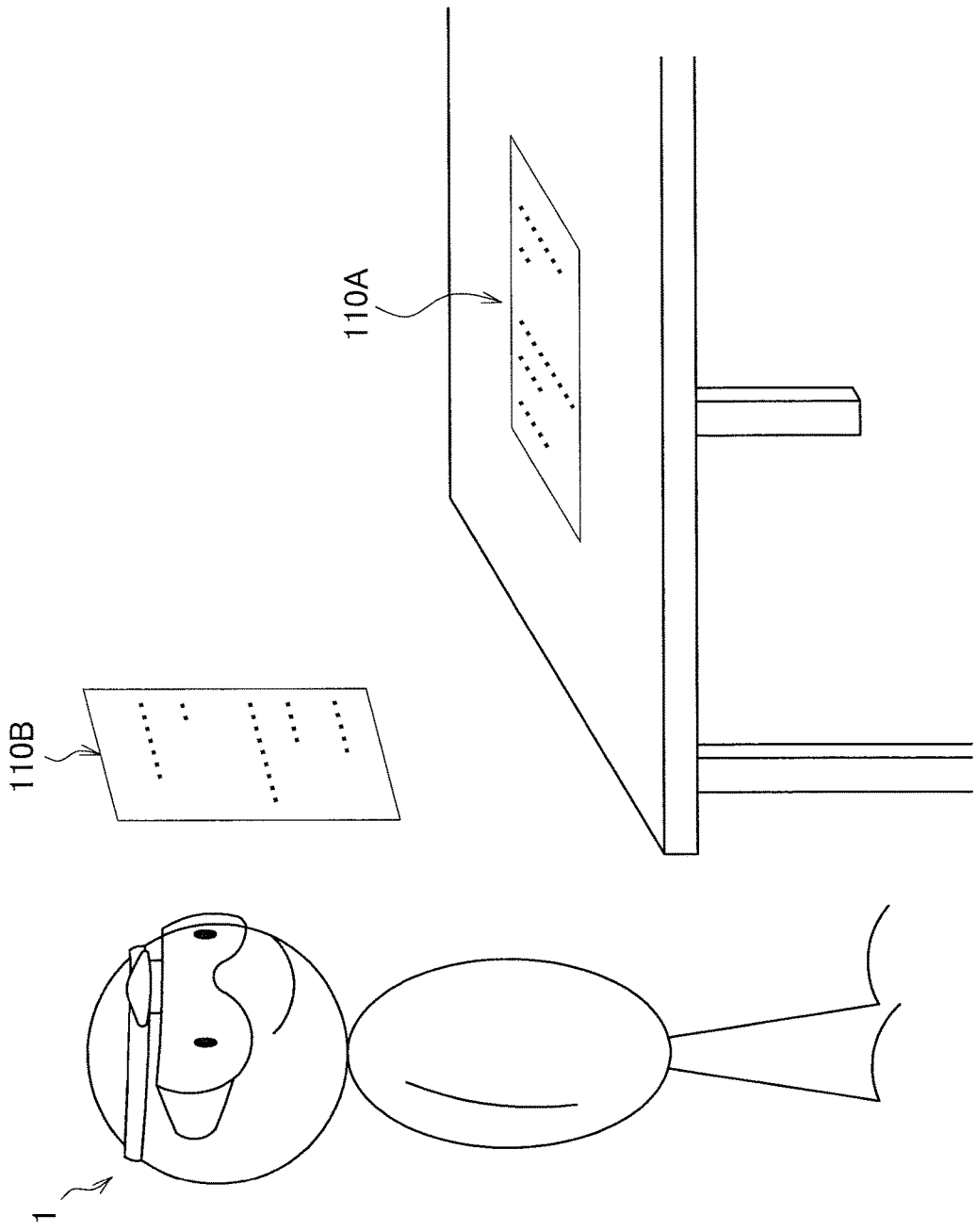
FIG. 4 is a diagram for describing a display control process performed by a display device according to the present embodiment.

FIG. 4 is a diagram for describing a display example of the virtual object according to the present embodiment. As illustrated in FIG. 4, the user wearing the display device 1 is looking at a table. Virtual objects 110A and 110B are displayed by the display device 1 and visible to the user. For example, in the first process, the display device 1 displays the virtual objects in accordance with a position, a posture, a shape, or the like of the real object. For example, in the example illustrated in FIG. 4, the virtual object 110A is displayed as if the virtual object 110A stuck to a top surface of a table through the first process. On the other hand, in the second process, the display device 1 displays the virtual object regardless of the real object. For example, in the example illustrated in FIG. 4, the virtual object 110B is displayed as if the virtual object 110B floated while moving forward along the line of sight of the user through the second process.

Here, in this specification, a "position" may mean a position in the real space perceived by the user (that is, real space coordinates) or may mean a position on the display unit 20 (for example, a transmissive type display) (that is, coordinates on a screen). However, the display of the virtual object may be different depending on what it means. For example, even when there is a sense of perspective as the position perceived by the user, it may be displayed at the same position on the display unit 20.

The virtual object may be operation information which is a target operated by the user. For example, the user is able to input information, and the like by touching the virtual object. In a case in which the virtual object floats in the air, it has been difficult for the user to perform an operation while receiving feedback indicating that an operation is performed by touching the virtual object. On the other hand, in a case in which the virtual object is displayed on the surface of the real object, the user is able to touch the virtual object and touch the real object, and thus the user is able to perform an operation while receiving feedback.

The first process and the second process will be described below in detail.

(1) First Process (1a) Basic Policy

For example, the display device 1 may change the display of the virtual object on the basis of the shape of the detected real object in the first process. Accordingly, the virtual object is more naturally superimposed on the real space when viewed by the user.

Specifically, the display device 1 changes the display of the virtual object by changing the relative posture of the virtual object to the detected real object and/or by transforming the shape of the virtual object. For example, in a case in which the plane set as the display region in the detected real object does not faces the user, that is, in a case in which the display region is not orthogonal to the line-of-sight direction of the user, the display device 1 rotates the virtual object by an angle formed by the display region and the line-of-sight direction. Further, for example, in a case in which the shape of the plane sot as the display region does not match the original shape of the virtual object, the display device 1 transforms the shape of the virtual object in accordance with the shape of the display region. Accordingly, the virtual object is viewed to be combined more integrally with the real object when viewed by the user. As a technique for changing the relative posture of the virtual object with respect to the real object, for example, a publicly known technique such as a technique described in JP 2012-221249A may be applied.

(1b) Superimposed Display on Surface of Real Object

The display device 1 may display the virtual object superimposed on the surface of the detected real object. For example, the display device 1 sets the surface of the real object as the display region, and maps the virtual object to the surface of the real object, and displays the virtual object. Accordingly, the virtual object looks to stick to the real object when viewed by the user. In a case in which the virtual object is displayed to be superimposed on the surface of the real object, visibility is improved as compared with a case in which the virtual object is displayed in the air which may overlap with the background. Note that the display device 1 may display the virtual object superimposed on the same surface as the surface of the real object (that is, on the surface of the real object) or may display the virtual object superimposed on a surface separated from the surface (for example, a plane region horizontally spaced apart from a plane region of the real object by several millimeters or several centimeters).

Here, the display device 1 may display the virtual object superimposed on a continuous surface among the surfaces of the detected real object. For example, the continuous surface is a region which has no shielding object or is not divided by a shielding object or the like in the plane region. Further, for example, the continuous surface may be regarded as a surface which has a flat slope change and/or a flat color tone change. Accordingly, the virtual object is displayed to be more easily visible when viewed by the user. Here, the present display example will be described with reference to FIGS. 5 and 6.

Figure 5:
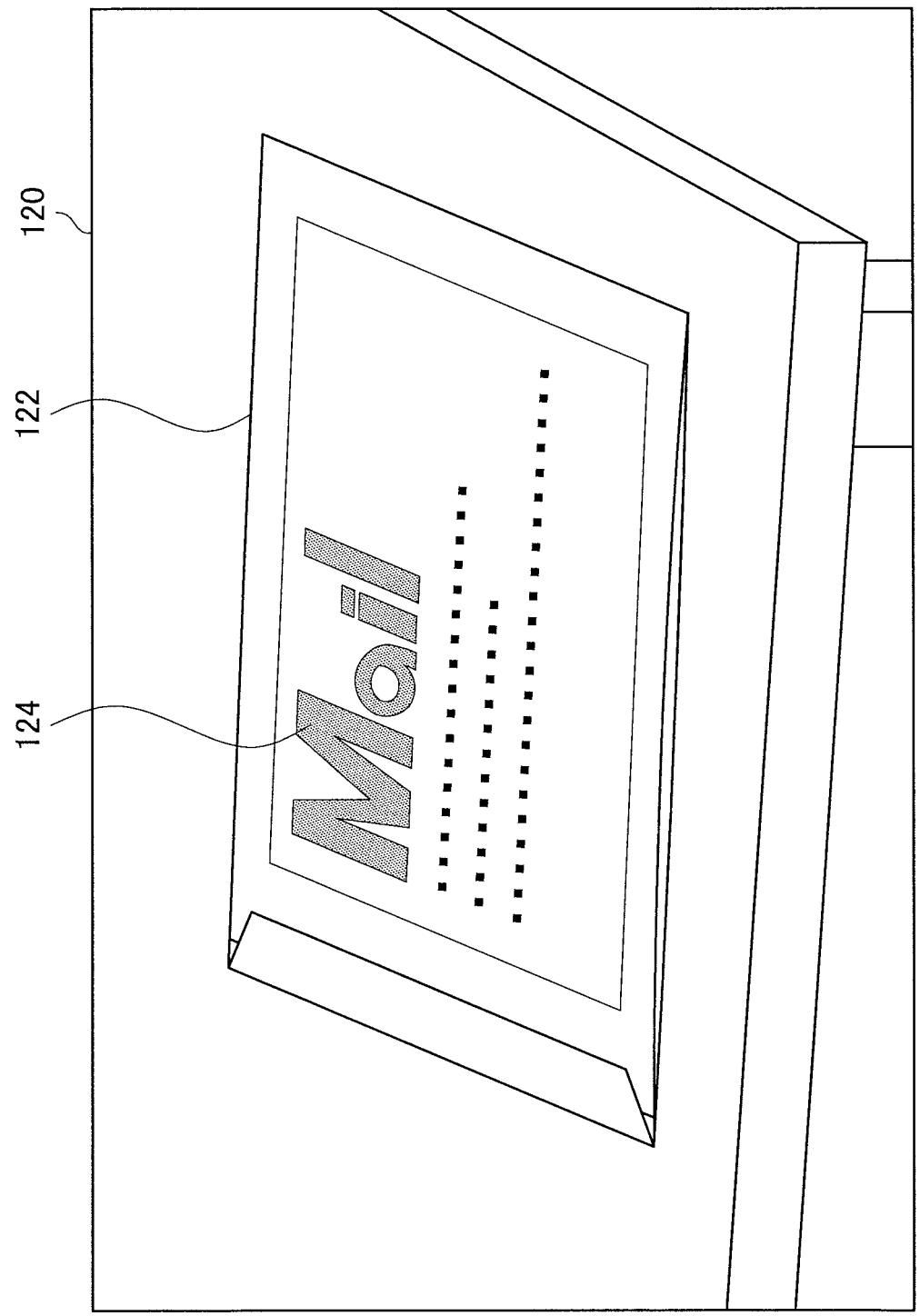
FIG. 5 is a diagram for describing a display example of a virtual object according to the present embodiment.

FIG. 5 is a diagram for describing a display example of the virtual object according to the present embodiment. In an example illustrated in FIG. 5, in a real space image 120, an envelope 122 is placed on the table. For example, the display device 1 sets a surface of envelope 122 which has a flat slope change and a flat color tone change as the display region and displays a virtual object 124 on the envelope 122.

Figure 6:
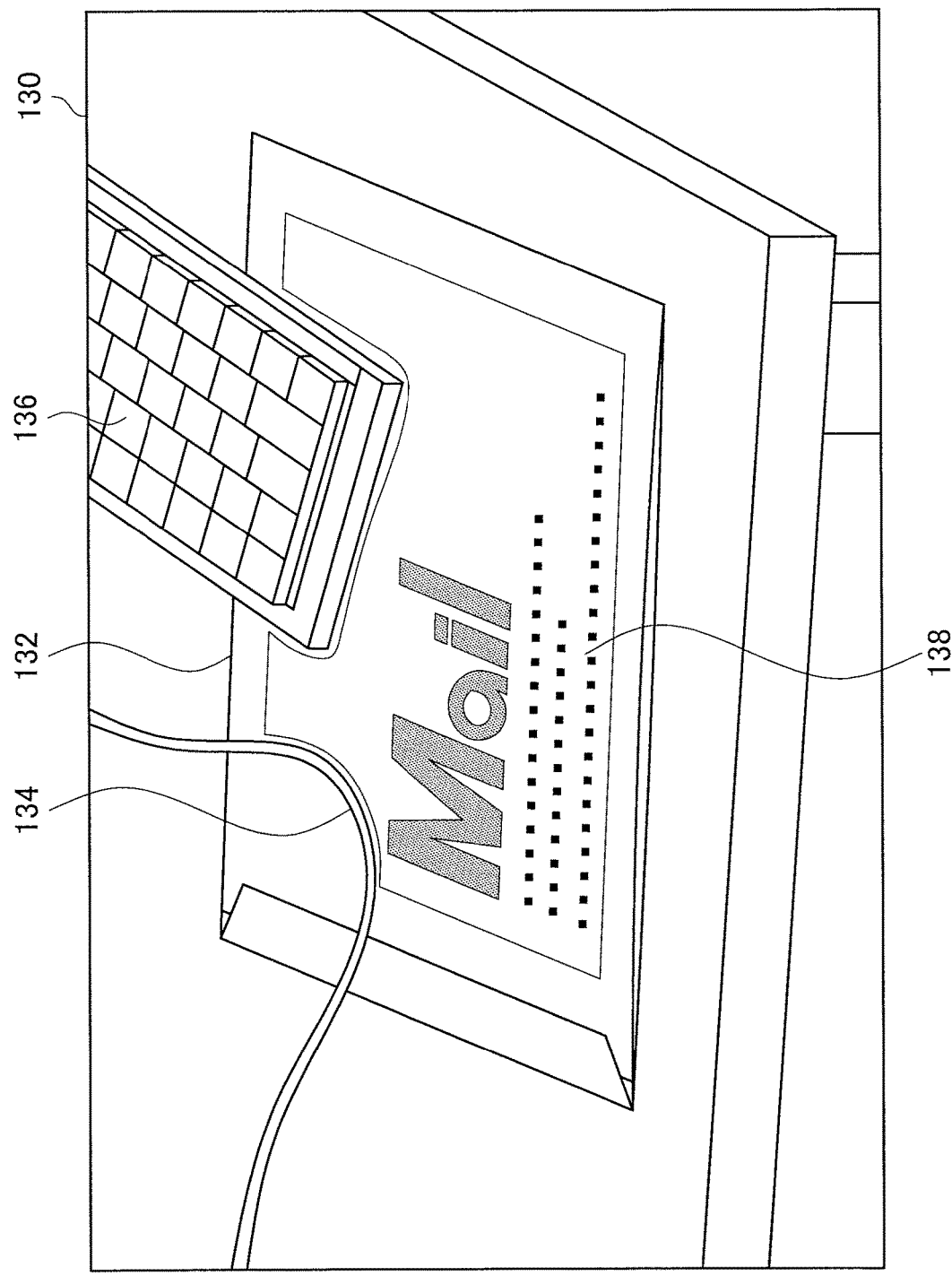
FIG. 6 is a diagram for describing a display example of a virtual object according to the present embodiment.

FIG. 6 is a diagram fir describing a display example of the virtual object according to the present embodiment. In an example illustrated in FIG. 6, in a real space image 130, an envelope 132 is placed on the table, and a cable 134 and a keyboard 136 are further placed on the envelope 132. For example, the display device 1 sets a portion which is not blocked by the cable 134 and the keyboard 136 serving as the shielding object in the surface of the envelope 132 which is the continuous surface having a flat slope change and a flat color tone change as the display region, and causes a virtual object 138 to be displayed on the set region.

Further, the display device 1 may display the virtual object superimposed on the surface determined to be horizontal or the surface determined to be vertical among the surfaces of the detected real object. The display device 1 may determine a horizontal or vertical surface on the basis of the spatial information. For example, the display device 1 displays the virtual object on a ground or a top surface of a table or the like determined to be horizontal, or a wall determined to be vertical, or the like. Accordingly, the virtual object is displayed to be easily visible when viewed by the user.

Note that it is determined whether or not it is the around on the basis of an acceleration direction, a size of a plane, a relative position to the display device 1, whether or not the plane is lowest among the horizontal planes, or the like. In a case in which the ground is set as the display region, the display device 1 is able to perform navigation according to a terrain.

(1c) Superimposed Display in Air

Further, the display device 1 may display the virtual object superimposed on a position spaced apart from the detected real object. For example, the display device sets the display region in various spaces such as a surface on an extension of the surface of the real object, a space above the real object, or a space between the real object and the user. More simply, the display device 1 displays the virtual object as if it is floating in the air. Accordingly, it is possible to display the virtual object in association with the real object, for example, even when the surface of the real object has no suitable display region. Note that, preferably, the display region set in the air faces the user.

(2) Second Process

For example, the display device 1 may display the virtual object superimposed on the real space in the line-of-sight direction of the user in the second process. For example, the display device 1 causes the virtual object to move on with the movement of the line of sight of the user on the basis of the spatial information and/or a result of recognizing an image captured by the inward facing stereo camera 10. Accordingly, the virtual object is seen to follow the line of sight at a predetermined distance in the air in front of the eye when viewed by the user.

Further, the display device 1 may display the virtual object superimposed on a position based on the head of the user in the second process. For example, the display device 1 may cause the virtual object to move on with the movement of the head of the user on the basis of the spatial information. Accordingly, for example, since the virtual object is consistently within the field of view when viewed by the user, it is possible to cause the eyes not to be blocked. For the similar purpose, the display device 1 may display the virtual object superimposed on a position based on the display surface (for example, the display unit 20) in the second process.

Further, the display device 1 may display the virtual object superimposed on an arbitrary position in the real space in the second process. For example, the display device 1 displays the virtual object superimposed on a position which is associated with neither the real object nor the user. For example, the display device 1 may display the virtual object at a position corresponding to a geographical position.

(3) Switching

The display device 1 may perform switching between the above-described first process and second process. Accordingly, the display device 1 is able to select an appropriate process according to an environment of the user and/or content. A switching criterion can be considered variously.

For example, the display device 1 may perform the switching on the basis of information related to the user and/or information related to the virtual object. The information related to the user can be variously considered. Examples of the information related to the user may include information related to the environment of the user, information indicating an instruction given by the user, biometric information, position information, operation information, information related to an application being used, and information indicating a relation between the user and the real object. Note that the information indicating the relation may indicate, for example, information indicating a positional relation, information indicating a posture relation, information indicating a relation of attribute information, or the like. The information related to the virtual object can be also variously considered. For example, the information related to the virtual object may include information indicating content or freshness of the virtual object, a relation between the virtual object and the real object, or the like. In addition to the above-mentioned information, for example, information indicating a relation between the user and the virtual object may be considered as the information related to the user and the information related to the virtual object. The display device 1 may perform the switching on the basis of at least one piece of the above-mentioned information.

For example, the display device 1 may perform the switching in accordance with the content of the virtual object. For example, the display device 1 may display the virtual object at the position based on the real object (for example, the surface of the real object) in a case in which a degree of urgency of content is low or may display the virtual object at the position not based on the real object (for example, the air in front of the eyes of the user) in a case in which the degree of urgency is high. Further, the display device 1 may display the virtual object at the position based on the real object (for example, the surface of the real object or the air in the vicinity) in a case in which content is associated with the real object or may display the virtual object at the position not based on the real object (for example, the air in front of the eyes of the user) in a case in which content is not associated with the real object.

For example, the display device 1 may perform the switching in accordance with a distance between the real object and the user. For example, the display device 1 may display the virtual object at the position based on the real object in a case in which the real object in which the display region is settable is positioned nearby the user or may display the virtual object at the position not based on the real object in a case in which the real object in which the display region is settable is positioned far from the user.

For example, the display device 1 may switch in accordance with an instruction given by the user.

2.3. Display Region Setting Criteria

The display device 1 (for example, the display control unit 45) is able to set the display region on the basis of various criteria.

For example, the display device 1 may give priorities to the surface of real object, the space based on the real object, and the space not based on the real object and set the display region For example, the display device 1 may preferentially set the display region on the surface of the real object. Further, the display device 1 may set the display region in the air in a case in which there is no appropriate display region on the surface of the real object or in a case in which it is requested by content. Further, the display region 1 may set the display region facing the user in the air nearby the real object for the plane region which has the flat color change but does not face the user. Further, the display device 1 may set the display region in the air or set the display region on a plane that has already gone out of the field of view in a case in which a display region for display a new virtual object is insufficient in a state in which a plurality of virtual object are displayed.

For example, the display device 1 may set the display region to avoid the shielding object in a case in which the virtual object is displayed in the air. For example, the virtual object may be displayed in front of the real object although the display region is set at a position which is originally hidden behind the real object and invisible. In such a case, for example, the display device 1 adjusts the display position to on the left or right side of the real object or set the display region in front of the real object in order to avoid the real object. Accordingly, the parallax inconsistency is solved, and the burden on the eyes is reduced.

For example, the display device 1 may set the display region in accordance with the degree of urgency of content. For example, for content with a high degree of urgency, the display device 1 sets the display region by evaluating whether the content is located in the middle of the field of view of the user rather than color flatness, or the like. Further, the display device 1 may set the display region in the air in front of the eyes to move on with the line of sight of the user. Accordingly, the user is able to easily notice information having the high degree of urgency.

For example, the display device 1 may fix the display region to the real world. For example, the display device 1 may store the position of the display region and cause the virtual object to be displayed on the same display region. Further, the display device 1 may fix the display region for each same or similar content. For example, the display device 1 may cause a virtual object of a video to be displayed on the wall surface and cause a virtual object of a text to be displayed on the table.

For example, the display device 1 may control the position at which the virtual object is superimposedly displayed in accordance with the distance between the real object and the user. For example, the display device 1 preferentially sets the display region on the surface of the real object located at a position close to the user. Accordingly, the virtual object is displayed in a range in which the user is able to easily perform an operation, for example, in a range in which the hand reaches, and thus convenience is improved.

For example, the display device 1 may set the display region on the surface of the real object associated with the content of the virtual object or a region nearby the real object. For example, in a case in which a result of recognizing a real object placed on a table is displayed, the display device 1 may cause the recognition result to be displayed next to the real object.

For example, the display device 1 may set the display region on the basis of information related to the real object. For example, the display device 1 may set the display region to avoid the real object which it is undesirable for the user to touch. For example, the display device 1 does not set the display region on the surface of the real object which is detected to be very hot by an infrared sensor. Accordingly, it is possible to increase safety of the user in a case in which the virtual object is an operation target of the user.

For example, the display device 1 may set a curved surface as the display region in addition to a plane. In that case, the display device 1 lays out the virtual object in a curved surface form and displays the virtual object to stick to the curved surface. Further, in a case in which there is an undulating portion in the display region, the display device 1 may lay out the virtual object in accordance with the undulating portion.

For example, in a case in which a plurality of virtual objects are displayed, the display device 1 may select the display region in accordance with an area necessary for the virtual object. For example, the display device 1 causes a virtual object having a large display size to be displayed on a large plane and causes a virtual object having a small display size to be displayed on a small plane with reference to a display size and the like described in content.

2.4. Display Control Based on Interaction

The display device 1 (for example, the display control unit 45) is able to perform display control in accordance with an interaction with the user.

For example, the display device 1 controls the position at which the virtual object is superimposedly displayed in accordance with the instruction given by the user. Resides, the display device 1 may switch content or control a display form (color or the like) in accordance with the user instruction. Accordingly, a display more desirable to the user is performed, and a comfortable operation for the virtual object is implemented. For example, the instruction may be given by the user by a gesture performed by a hand or the like, the line of sight, marker embedding, or the like. Here, the present display example will be described with reference to FIGS. 7 to 10.

Figure 7:
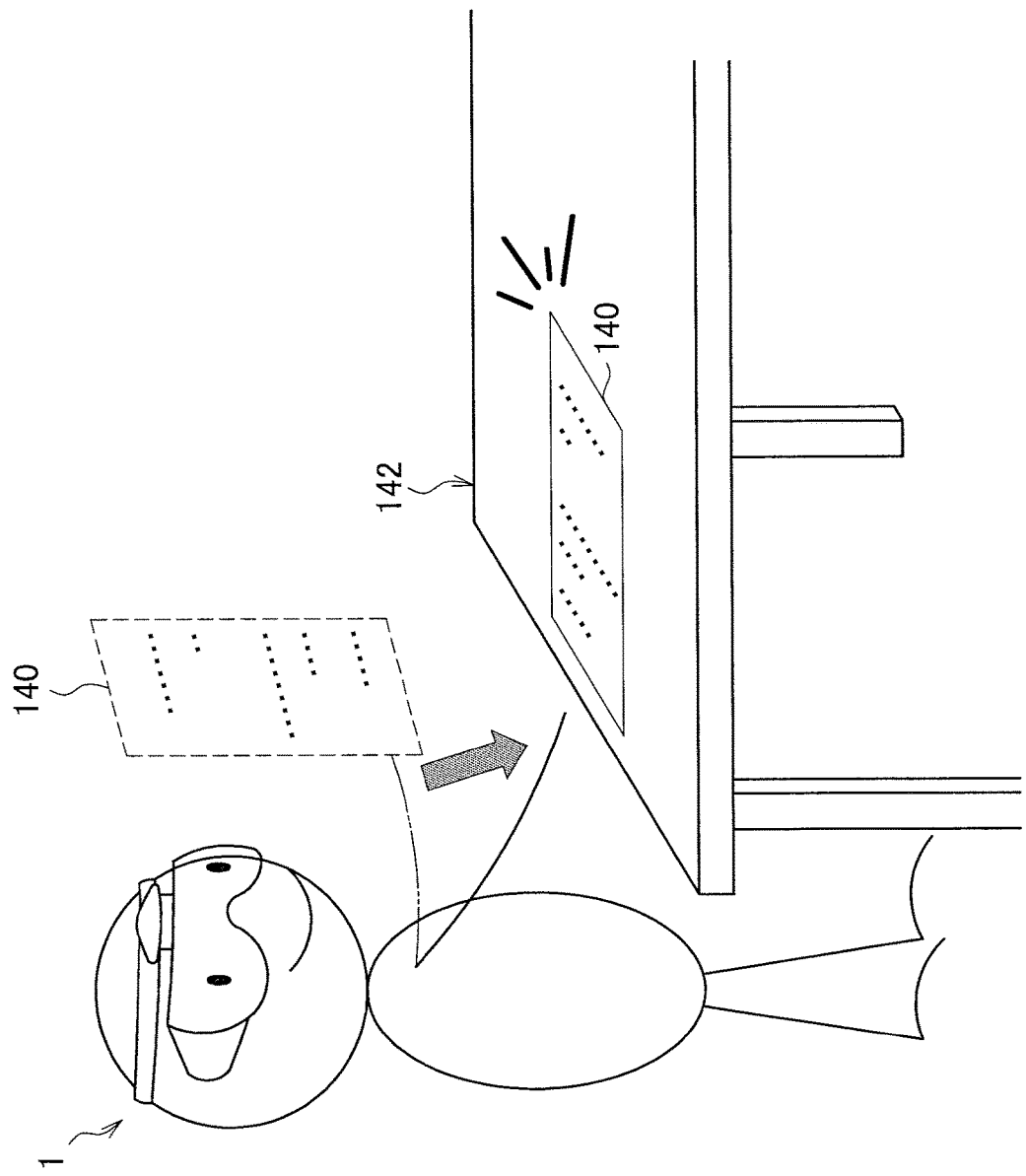
FIG. 7 is a diagram for describing a display example of a virtual object according to the present embodiment.

FIG. 7 is a diagram for describing a display example of the virtual object according to the present embodiment. In an example illustrated in FIG. 7, the display device 1 sets the display region in accordance with the gesture. As illustrated in FIG. 7, if the user drags a virtual object 140 being displayed in the air onto a plane 142 with a finger, the display device 1 moves the virtual object 140 to the surface of the plane 142 and displays the virtual object 140.

Figure 8:
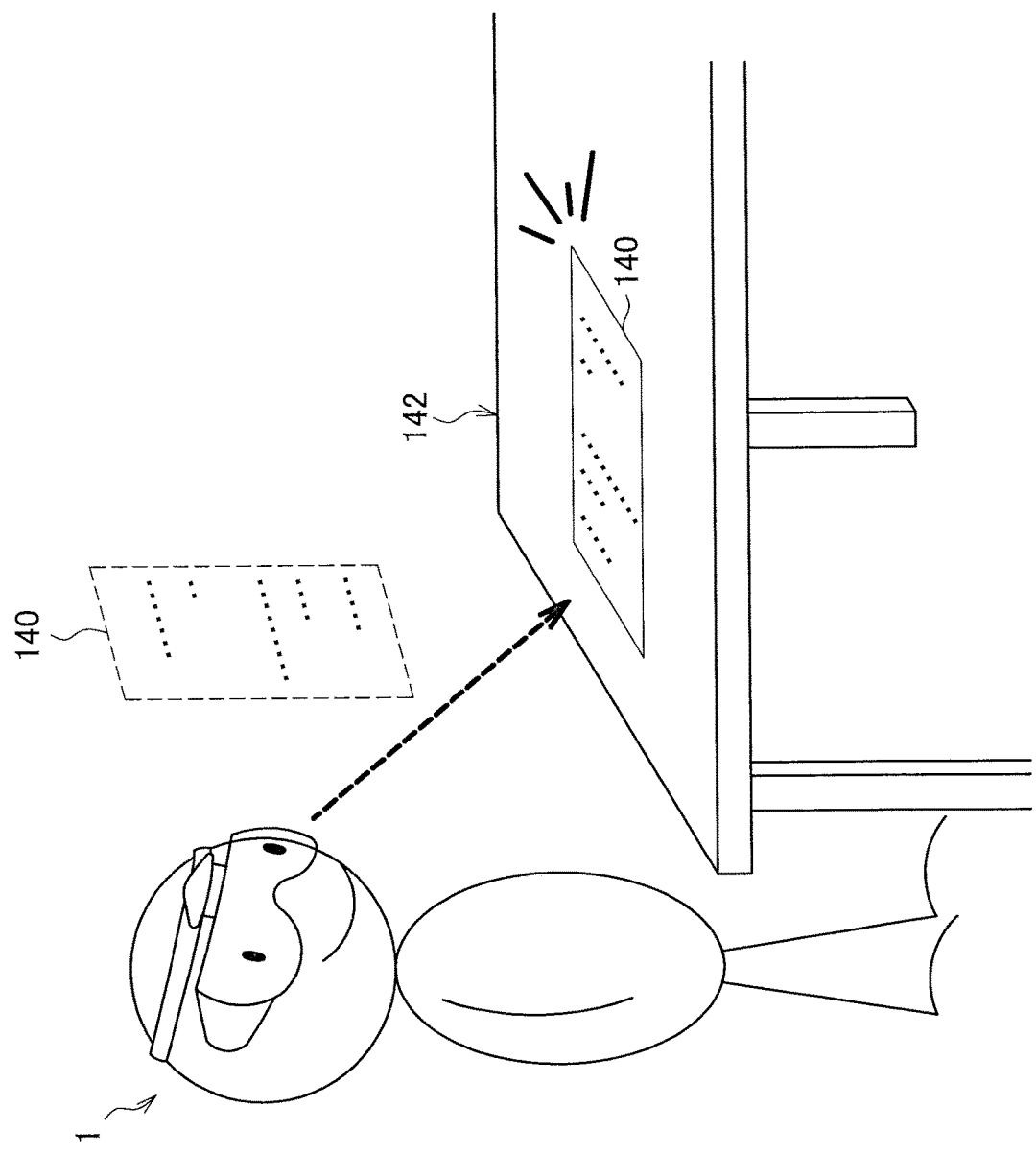
FIG. 8 is a diagram for describing a display example of a virtual object according to the present embodiment.

FIG. 8 is a diagram for describing a display example of the virtual object according to the present embodiment. An example illustrated in FIG. 8 is an example in which the display device 1 sets the display region in accordance with the line of sight. An illustrated in FIG. 8, in a case in which the user looks at the plane 142 for a predetermined time, the display device 1 moves the virtual object 140 being displayed in the air to the surface of the plane 142 and displays the virtual object 140.

Figure 9:
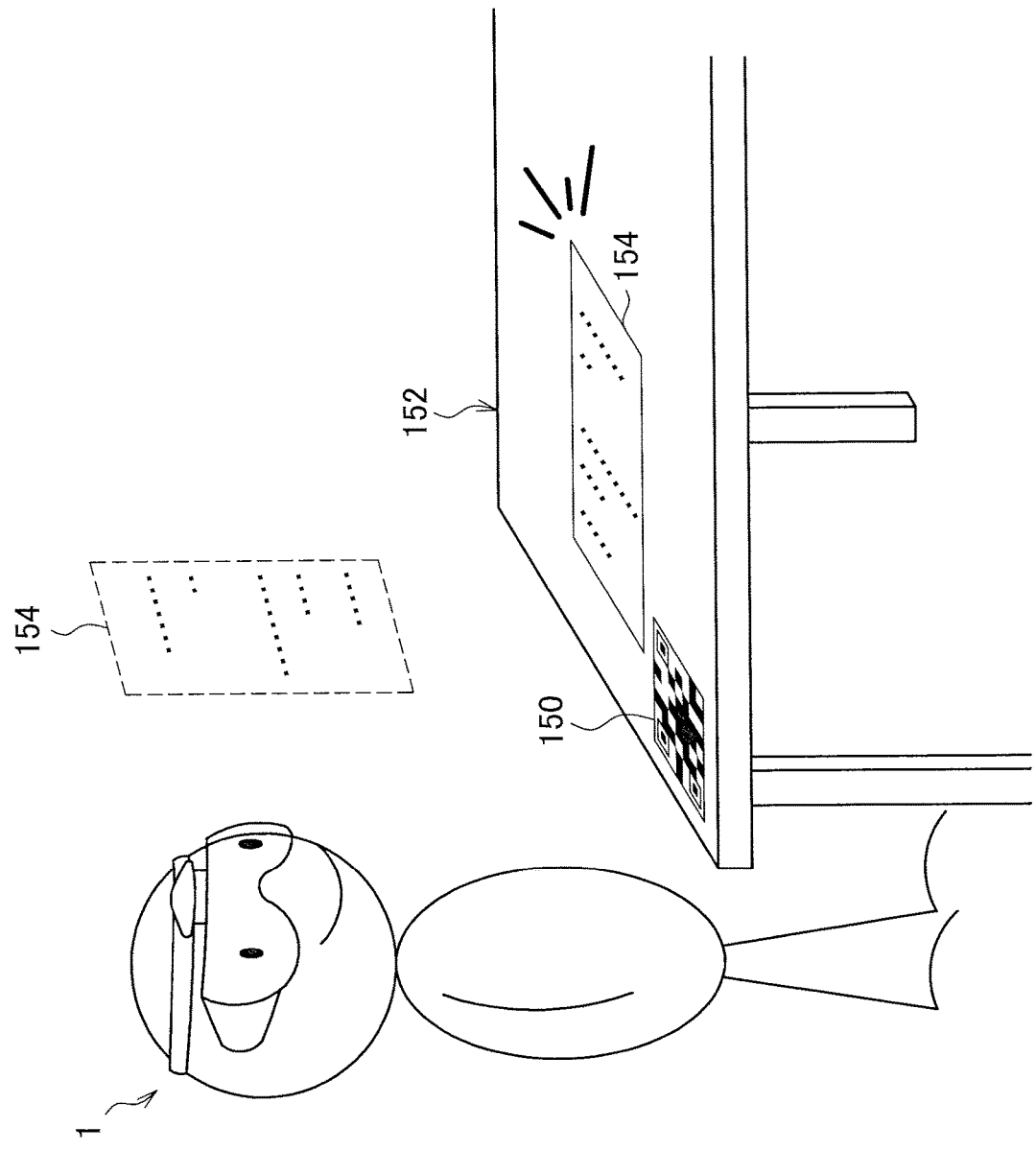
FIG. 9 is a diagram for describing a display example of a virtual object according to the present embodiment.

FIG. 9 is a diagram for describing a display example of the virtual object according to the present embodiment. In an example illustrated in FIG. 9, the display device 1 sets the display region in accordance with the marker. As illustrated in FIG. 9, in a case in which a plane 152 in which a specific marker 150 such as a QR code (a registered trademark) is embedded is detected, the display device 1 moves a virtual object 154 corresponding to the marker 150 being displayed in the air to the plane 152 and displays the virtual object 154.

Figure 10:
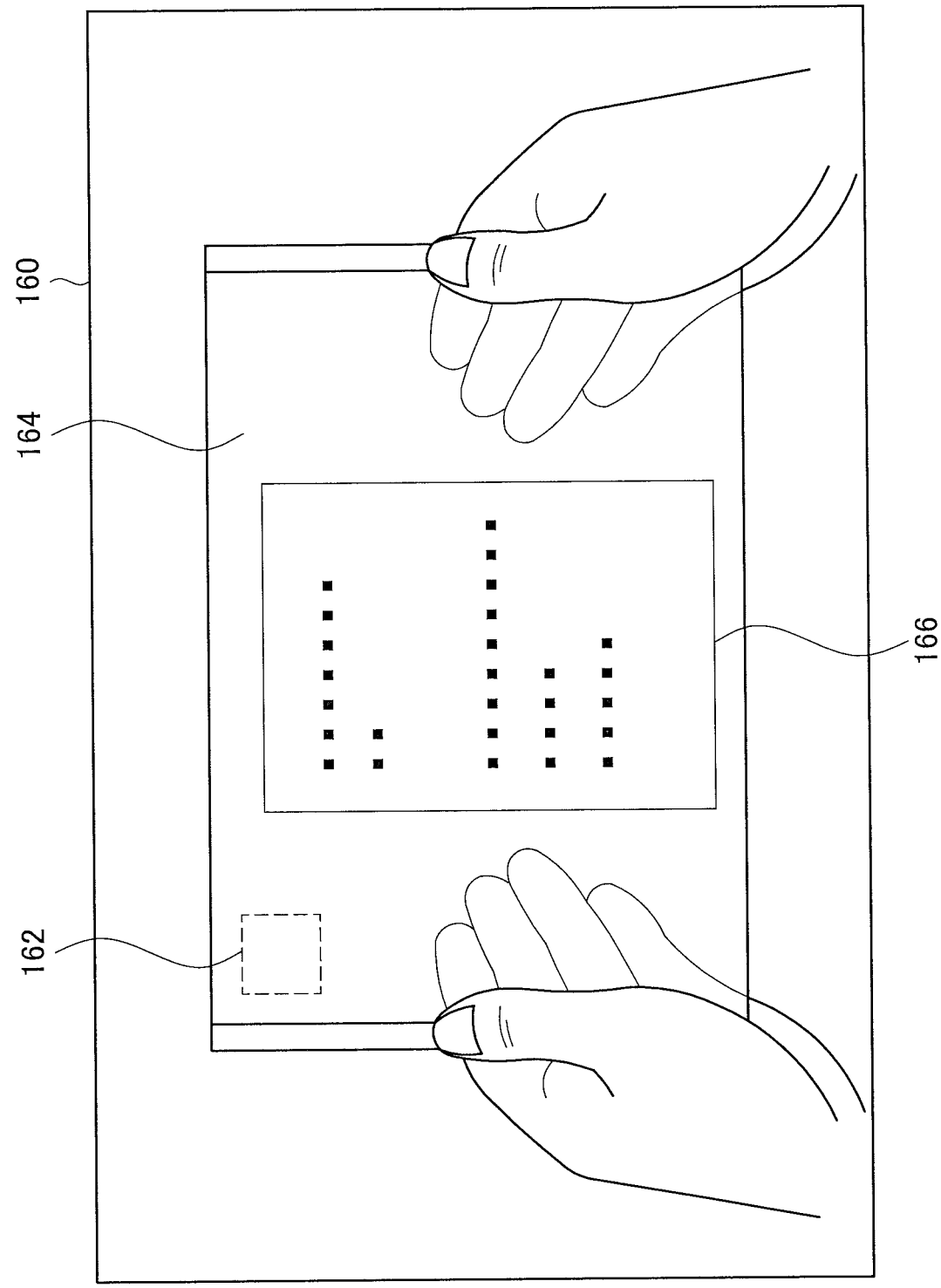
FIG. 10 is a diagram for describing a display example of a virtual object according to the present embodiment.

FIG. 10 is a diagram for describing a display example of the virtual object according to the present embodiment. In an example illustrated in FIG. 10, the display device 1 sets the display region in accordance with the marker. As illustrated in FIG. 10, a marker 162 is embedded in a transparent panel 164 such as a glass panel. For example, the display device 1 may irradiating the panel 164 with a specific wavelength and detect the marker 162. Accordingly, in a real space image 160, the panel 164 that is seen to be just a transparent plane with the naked eye is used as the display region for a virtual object 166.

Note that, in the examples illustrated in FIGS. 7 to 10, the virtual object is moved to the plane, but the present technology is not limited to these examples. For example, the display device 1 may move the virtual object from a plane to a plane in accordance with the user instruction, move the virtual object from the air to the air, or move the virtual object from a plane to the air.

Further, in a case in which the user puts a graspable plane in front of the eyes or creates a plane with the palm of the hand, the display device 1 is also able to set the display region on these planes. As a method of detecting the user operation on the virtual object being displayed on such a plane, the display device 1 may acquire vibration information from a wearable device such as a watch type worn on a body of the user and use the vibration information for detection of the user operation. In this case, the display device 1 is able to accurately identify whether or not the finger of the user touches the plane through the vibration information, and thus the operability of the touch operation is further improved. Furthermore, since the display device 1 is able to distinguish the touch operation of touching the plane and the gesture operation performed in front of the plane, the operations performed using the operations separately or together can be implemented with a higher degree of accuracy.

2.5. Processing According to Display Region

The display device 1 (for example, the display control unit 45) is able to perform various kinds of processing according to the display region.

For example, the display device 1 may process the virtual object in accordance with the shape of the display region. Specifically, the display device 1 controls the layout of the virtual object in accordance with the shape of display region. The display device 1 may employ a publicly known technique such as an HTML renderer as a layout engine. For example, a technique of switching a screen layout in accordance with a window size, a type of device, or the like or a technique of changing the layout of texts or the like in accordance with an arrangement of images or the like in the HTML may be adopted. Here, the present display example will be described with reference to FIG. 11.

Figure 11:
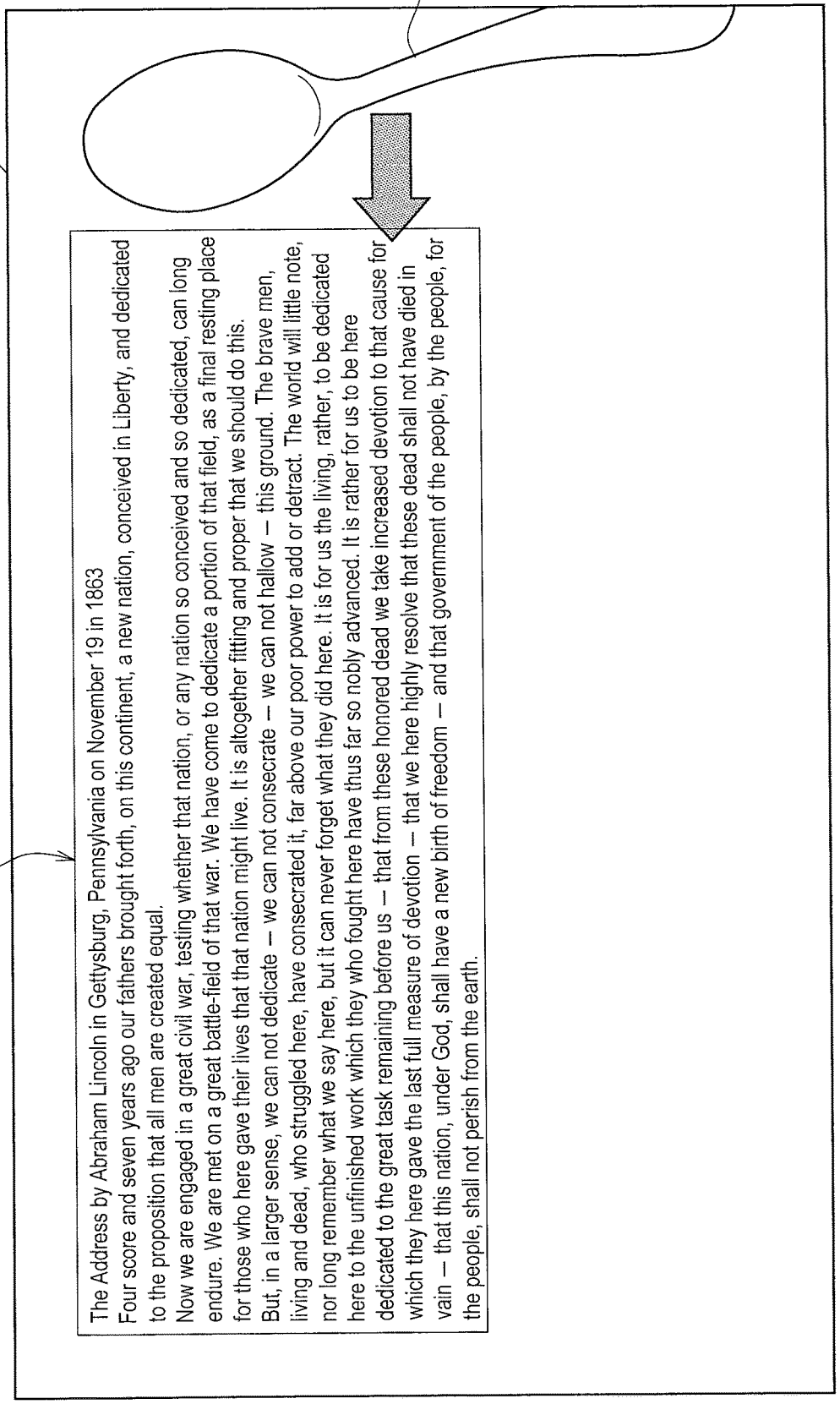
FIG. 11 is a diagram for describing a display example of a virtual object according to the present embodiment.

FIG. 11 is a diagram for describing a display example of the virtual object according to the present embodiment. In an example illustrated in FIG. 11, in a real space image 170, a virtual object 174 is displayed on a display region excluding a real object 172. As illustrated in FIG. 11, texts included in the virtual object 174 start a new line in accordance with the shape of the display region.

However, the shape of the display region may change. For example, a new real object (shielding object) may be added to the display region, or an existing real object may be deleted or moved. In such cases, the display device 1 may control the layout of the virtual object in accordance with the change in the shape of the display region. Here, the present display example will be described with reference to FIG. 12.

FIG. 12 is a diagram for describing a display example of the virtual object according to the present embodiment. The display example illustrated in FIG. 12 illustrates a change from the display example illustrated in FIG. 11. As illustrated in FIG. 12, in a real space image 180, a real object 182 is moved to a region which is included in the display region in the real space image 170 illustrated in FIG. 11, and the layout of a virtual object 184 is changed in accordance with a narrowed shape, and a position at which texts start a new line is changed. Further, in a case in which a new plane is set as the display region, it is desirable that a new display region be set on a plane which is close in a position, an attribute of a real object on which it is superimposed, a slope, or the like to a previous display region.

Further, the display device 1 may process the content of the virtual object in accordance with the display region. For example, the display device 1 switches the content to be displayed in accordance with a shape, a color, a size, or the like of the display region. Furthermore, the display device 1 may switch the content to be displayed on the basis of a real object serving as a reference for the position of the display region, a real object close to the display region, or the like. Here, the present display example will be described with reference to FIG. 13.

FIG. 13 is a diagram for describing a display example of the virtual object according to the present embodiment. In the example illustrated in FIG. 13, in a real space image 190, a virtual object 192 of an analog clock is displayed on a wall surface. For example, this arrangement is performed because the display region is the wall surface, and the area of the display region is large. On the other hand, in a real space image 194, a virtual object 196 of a digital clock is displayed on a table. For example, this arrangement is performed because the display region is the surface of the table, and the area of the display region is small.

Further, the display device 1 may set the display region or process the virtual object in accordance with the background.

For example, the display device 1 may control the position at which the virtual object is superimposedly displayed in accordance with the background of the region on which the virtual object can be superimposedly displayed and a display form of the virtual object. For example, it may be hard to see content of the virtual object depending on brightness of the background. Further, it may be hard to see content of the virtual object depending on a relation between the color tone of the background and the color tone of the virtual object. In consideration of such a case, the display device 1 may set the display region to avoid the region in which it is hard to view the virtual object. Accordingly, the virtual object is displayed to be more easily visible when viewed by the user. Here, the present display example will be described with reference to FIG. 14.

Figure 14:
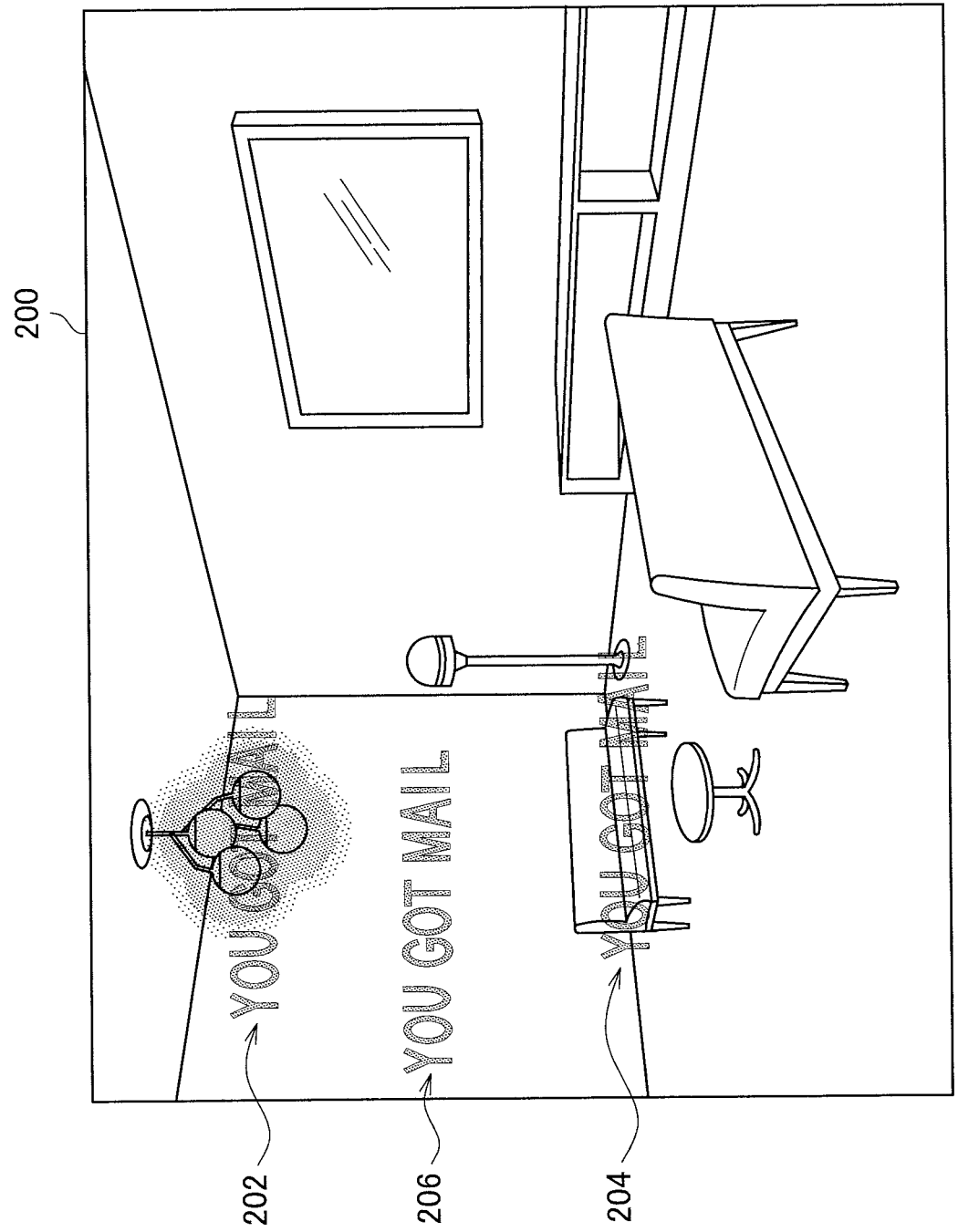
FIG. 14 is a diagram for describing a display example of a virtual object according to the present embodiment.

FIG. 14 is a diagram for describing a display example of the virtual object according to the present embodiment. In an example illustrated in FIG. 14, in a real space image 200, respective virtual objects are displayed on display regions 202, 204, and 206 floating in the air. For example, in the display region 202, there is an electric lamp in the background, and it is hard to view content of the virtual object due to influence of brightness. Further, in the display region 204, it is hard to view content of the virtual object because there is a real object in the background. On the other hand, in the display region 206, the background is flat, and thus content of the virtual object is clearly seen. Therefore, the display device 1 preferentially employs the display region 206.

Furthermore, the display device 1 may control the display form of the virtual object in accordance with the background of the region on which the virtual object is superimposedly displayed. For example, it may be hard to see content of the virtual object depending on a relation between the color tone of the background of the display region and the color tone of the virtual object. In consideration of such a case, for example, the display device 1 performs processing of emphasizing the virtual image using a color complementary to the color of the background or not emphasizing the virtual image using a color close to the color of the background. This processing function may be included in content itself Further, the display device 1 may perform display control corresponding to a real object in the vicinity of the display region. For example, the display device 1 may cause a virtual object including information related to a sentence to be displayed next to a notebook on a table in a case in which the user is writing the sentence on the notebook on the table. The user is able to execute, for example, information search by operating the virtual object. Further, the display device 1 may update the display region in real time, for example, by causing the virtual object to be displayed on a new empty region made on the table as a result of moving in a ease in which the notebook is moved.

2.6. Display Control in Accordance with the User

The display device 1 (for example, display control unit 45) is able to perform display control according to the user.

For example, the display device 1 may perform display control according to an action of the user. For example, the display device 1 excludes a region blocking the center of the field of view from a display region setting target while the user is driving a vehicle. Further, the display device 1 may perform display control according to whether or not the user is stationary. For example, in a case in which the user is stationary, for example, in a case in which the user faces a table, a fixed display region is set on the table, and in a case in which the user is moving, for example, in a case in which the user is running, a display region moving together with the user is set. In other words, the display device 1 fixedly sets the display region in the coordinate system of the real world while the user is stationary, and fixedly sets the display region in a coordinate system in which the user serves as an origin while the user is moving.

For example, the display device 1 may perform display control according to a position of the user. For example, in a case in which map information is displayed, the display device 1 causes the map information to be displayed on the ground when the user is far from the destination, and causes a virtual object indicating the destination to be displayed nearby the destination when the user is close to the destination.

For example, the display device 1 may perform display control according to the line of sight of the user. For example, in a case in which the display region disappears fro the field of view, the display device 1 may set a new display region while storing the position of the display region, display the virtual object, and causes the virtual object to return to the previous display region when the previous region comes into the field of view again. Further, the display device 1 may display a virtual object in which the line of sight does not concentrate in a normal mode and display a virtual object in which the line of sight concentrates in a notable mode in which a noticeable color, layout, or the like which is easily visible is used.

2.7. Other Display Control

The display device 1 (for example, the display control unit 45) is able to perform various other display controls.

For example, the display device 1 may perform display control according to a time. For example, the display device 1 displays a virtual object indicating news, or a weather forecast, or the like in the morning and displays a virtual object indicating a recipe site in the evening.

For example, the display device 1 may deal a plurality of regions as one display region. For example, in a case in which a cable is placed on a table, and a plane is divided into two, the display device 1 may set both of the two divided planes as the display region. In that case, the display device 1 simply sets a region where the cable is simply placed as a region in which rendering is prevented, and layouts content to avoid the region.

For example, in a case in which the number of virtual objects is large or in a case in which the color of the virtual object is familiar with the surroundings, it may be difficult to see the virtual object when viewed by the user. In such a case, the display device 1 may temporarily change color or perform vibration, for example, in a case in which a new virtual object appears or in a case in which there is a change in a virtual object. Accordingly, the user is able to notice a new or changed virtual object.

The technical features of the display device 1 according to the present embodiment have been described above. Next, an operation process example of the display device 1 according to the present embodiment will be described with reference to FIGS. 15 to 18.

3. OPERATION PROCESS EXAMPLE (1) Pre-Processing

Figure 15:
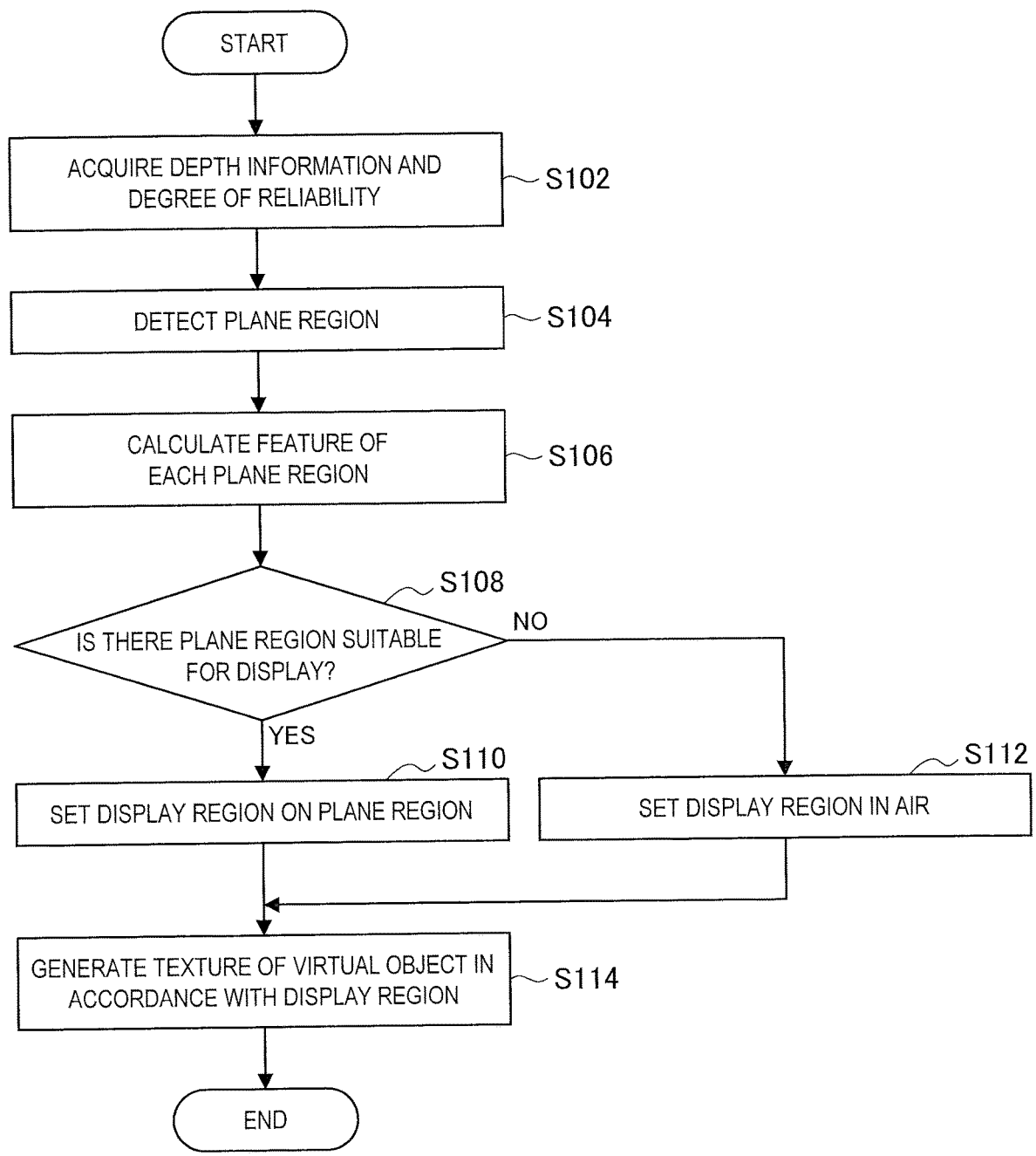
FIG. 15 is a flowchart illustrating an example of a flow of pre-processing performed in a display device according to the present embodiment.

FIG. 15 is a flowchart illustrating an example of the flow of pre-processing executed in the display device 1 according to the present embodiment. The present flow corresponds to the real object recognition process, the shielding object determination process, and the display region setting process described above with reference to FIG. 3.

As illustrated in FIG. 15, the detecting unit 41 acquires the depth information of each pixel and the degree of reliability of the depth information from the image obtained by the outward stereo camera 10 (step S102). Then, the display control unit 45 detects the plane region on the surface of the real object on the basis of the depth information and the degree of reliability (step S104). Then, the display control unit 45 calculates the feature of each plane region (step S106). The features of each plane region include, for example, an area, a normal line, a color, and a color variation degree of the plane region and may be calculated on the basis of, for example, the depth information and the degree of reliability.

Then, the display control unit 45 determines whether or not there is a plane region suitable for display (step S108). For example, the display control unit 45 determines that there is a plane region suitable for display in a case in which there is a plane region which has a flat color change, faces the user, and is small in a distance from the user, and has no virtual object displayed thereon. Further, the display control unit 45 determines that there is no plane region suitable for display in a case in which there is no plane region satisfying the conditions.

When it is determined that there is a plane region suitable for display (YES in step S108), the display control unit 45 sets the display region in the plane region (step S110), On the other hand, in a case in which it is determined that there is no plane region suitable for display (NO in step S108), the display control unit 45 sets the display region in the air (step S112).

The display control unit 45 then creates the texture of the virtual object by laying out and rendering content in accordance with the set display region (step S114). Then, the process according to the present flow ends.

(2) Rendering Process

Figure 16:
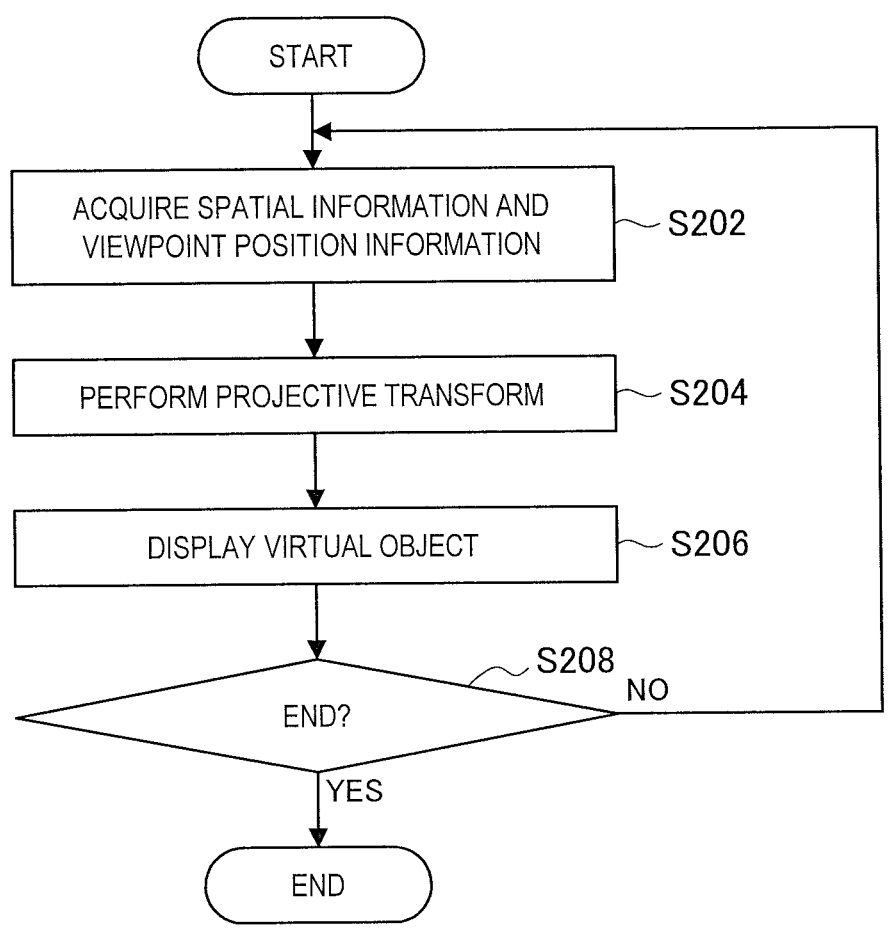
FIG. 16 is a flowchart illustrating an example of a flow of a rendering process performed in a display device according to the present embodiment.

FIG. 16 is a flowchart illustrating an example of the flow of the rendering process performed in the display device 1 according to the present embodiment. The present flow corresponds to the viewpoint position estimation process, the virtual object rendering process, and the display process described above with reference to FIG. 3 and is executed after the pre-processing described above with reference to FIG. 15.

As illustrated in FIG. 16, first, the detecting unit 41 acquires the spatial information and the viewpoint position information (step S202). Then, the display control unit 45 performs projective transform of the display region set in pre-processing into the coordinates on the display unit 20 on the basis of the spatial information and the viewpoint position information (step S204). Then, the display control unit 45 maps the texture of the virtual object generated in the pre-processing to the display region which has undergone the projective transform and displays the virtual object (step S206).

The display device 1 performs the above-described process for each frame, in a ease in which the rendering process does not end (NO in step S208), the process is performed again from step S202 for the next frame. In a case in which the rendering process ends (YES in step S208), the process according to the present flow ends.

Figure 17:
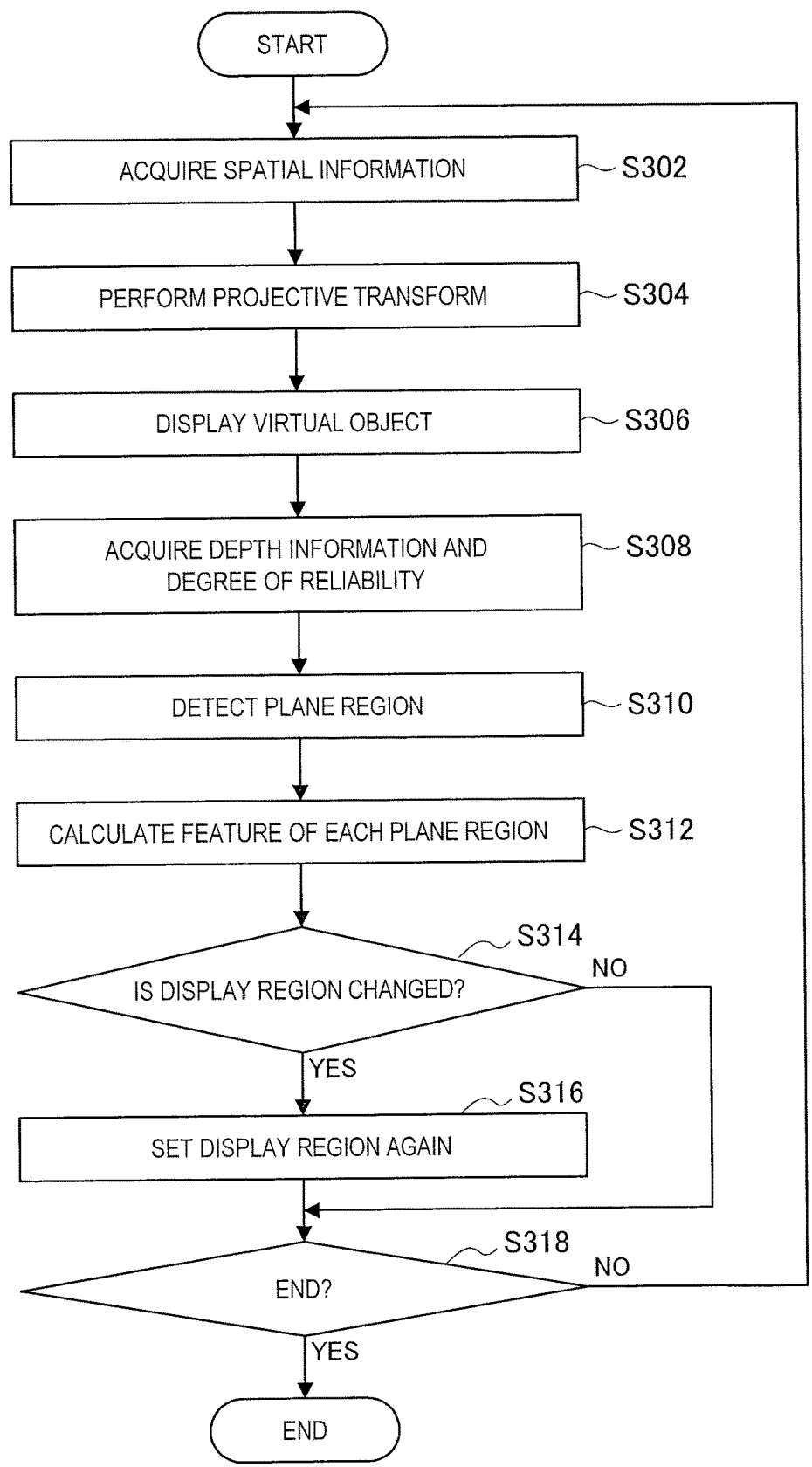
FIG. 17 is a flowchart illustrating an example of a flow of a rendering process performed in a display device according to the present embodiment.

FIG. 17 is a flowchart illustrating an example of the flow of the rendering process performed in the display device 1 according to the present embodiment. The present flow is a modification of the flow illustrated in FIG. 16.

As illustrated in FIG. 17, first in steps S302 to S306, a process similar to steps S202 to S206 described above with reference to FIG. 16 is performed. Then, in steps S308 to S312, a process similar to steps S102 to S106 described above with reference to FIG. 15 is performed.

Then, the display control unit 45 determines whether or not the display region is changed (step S314). For example, the display control unit 45 determines whether or not the display region is changed to a more suitable region (plane region or air) in accordance with movement of the field of view, addition/deletion/movement of the real object, a change in the degree of urgency of content, the presence or absence of the user instruction, or the like.

In a case in which the display region is determined to be changed (YES in step S314), the display control unit 45 resets the display region to a new region (step S316). On the other hand, in a case in which the display region is determined not to be changed (NO in step S314), the setting of the display region is maintained.

The display device 1 performs the above-described process for each frame. In a case in which the rendering process does not end (NO in step S318), the process is performed again from step S302 for the next frame. In a case in which the rendering process ends (YES in step S318), the process according to the present flow ends.

(3) Display Control Process According to Interaction

Figure 18:
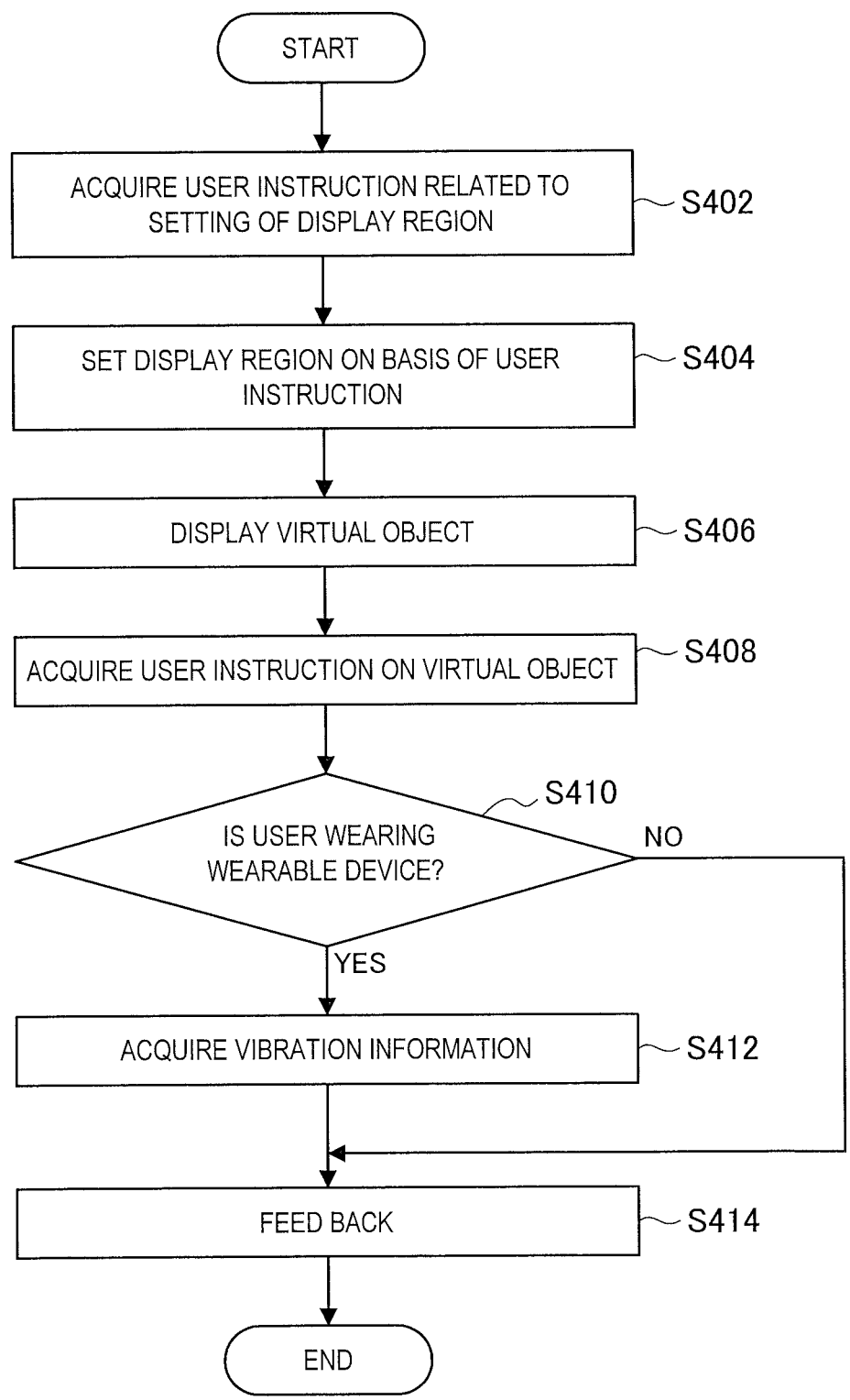
FIG. 18 is a flowchart illustrating an example of a flow of a display control process according to an interaction performed in a display device according to the present embodiment

FIG. 18 is a flowchart illustrating an example of the flow of a display control process according to the interaction performed in the display device 1 according to the present embodiment.

As illustrated in FIG. 18, first, the detecting unit 41 acquires a user instruction related to the setting of the display region (step S402). For example, the detecting unit 41 detects the gesture, the line of sight, or the plane in which a marker is embedded.

Then, the display control unit 45 sets the display region on the basis of the user instruction (step S404). For example, the display control unit 45 sets the display region on a plane to which the user drags the virtual object with the finger. Further, the display control unit 45 sets the display region on a plane at which the user looks for a predetermined time. Further, the display control unit 45 sets the display region on a plane in which a specific marker is embedded.

Then, the display control unit 45 causes the virtual object to be displayed on the set display region (step S406).

Then, the detecting unit 41 acquires the user instruction on the virtual object (step S408). For example, the detecting unit 41 recognizes a touch on the plane or the air in which the display region is set on the basis of the depth information or the like. Further, the detecting unit 41 determines whether or not the user is wearing a wearable device (step S410), and in a case in which the user is wearing a wearable device, the detecting unit 41 acquires vibration information from the wearable device (step S412). Then, the display control unit 45 displays a feedback on the acquired user instruction (step S414). In a case in which the vibration information is acquired, the display control unit 45 displays feedback further on the basis of the vibration information. Then, the process according to the present flow ends.

4. HARDWARE CONFIGURATION EXAMPLE

Figure 19:
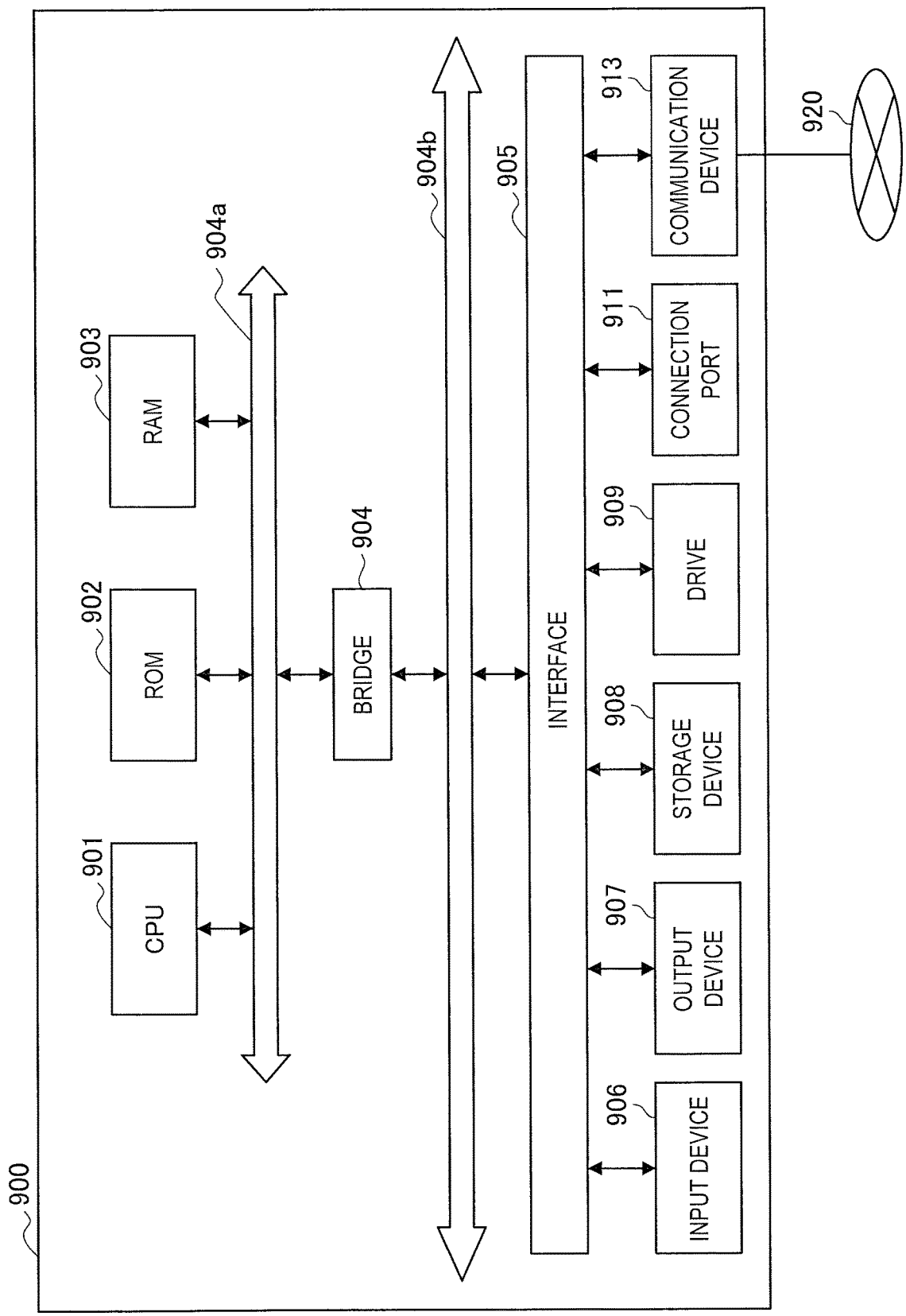
FIG. 19 is a block diagram illustrating an example of a hardware configuration of an information processing apparatus according to the present embodiment.

Finally, a hardware configuration of an information processing apparatus according to the present embodiment will be described with reference to FIG. 19. FIG. 19 is a block diagram illustrating an example of the hardware configuration of the information processing apparatus according to the present embodiment. Meanwhile, the information processing apparatus 900 illustrated in FIG. 19 may realize the display device 1 illustrated in FIG. 2, for example. Information processing by the display device 1 according to the present embodiment is realized according to cooperation between software and hardware described below.

As illustrated in FIG. 19, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as a DSP or an ASIC instead of the CPU 90i or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. For example, the CPU 901 is able to constitute the detecting unit 41, the storage control unit 43, and the display control unit 45 illustrated in FIG. 2.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a cellular phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The input device 906 may be realized as an imaging device, for example. The imaging device includes a lens system composed of an imaging lens, an iris, a zoom lens, a focus lens and the like, a driving system for causing the lens system to perform a focus operation and a zoom operation, a solid-state imaging sensor array for photoelectrically converting imaging light acquired through the lens system to generate an imaging signal, and the like. The solid-state imaging sensor array may be realized by a charge coupled device (CCD) sensor array or a complementary metal oxide semiconductor (CMOS) sensor array, for example. The imaging device outputs data of shot images in the form of digital signals. The imaging device may form the imaging unit 10 illustrated in FIGS. 1 and 2, for example.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals composed of reproduced sound data, audio data and the like into analog signals and aurally outputs the analog signals. The aforementioned display device may form the display unit 20 illustrated in FIGS. 1 and 2, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage unit 30 illustrated in FIG. 2, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

5. CONCLUSION

One embodiment of the present disclosure has been described above in detail with reference to FIGS. 1 to 19. As described above, the display device 1 according to the present embodiment performs the first process of displaying the virtual object superimposed on the real space at a position which is based on the real object or the second process of displaying the virtual object superimposed on the real space at a position which is not based on the real object. Accordingly, the method of implementing the virtual objects using the AI technology is diversified.

For example, in the first process, the display of the virtual object may be changed in accordance with the shape of the detected real object. More specifically, the virtual object is displayed on the surface of the real object in accordance with the shape of the real object. Through such a display, the virtual object becomes more familiar to the real world, and the user is able to accept the mixture of the virtual object and the real object with no discomfort feeling. Further, the display device 1 is also able to cause newly arriving information of a clock, news, an e-mail, or an SNS or the like to be displayed on a vacant region of a wall or the like in accordance with a degree of importance in an emphasized manner regardless of a place.

Accordingly, the user is able to easily acquire information without checking a terminal such as a smartphone individually. Further, the display device 1 is able to display the virtual object in accordance with the shape of the vacant region even in a case in which furniture is lined up in front of a wall, or objects are scattered on a table.

Further, in the second process, the virtual object may be superimposedly displayed on the position based on the head of the user. Accordingly, for example, although the virtual object consistently comes into the field of view when viewed by the user, the state in which the eyes are not blocked can be maintained.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the example in which the display device 1 is formed as a single device has been described, but the present technology is not limited to this example. For example, part or all of the display device 1 may be constituted as separate devices. For example, in the functional configuration example of the display device 1 illustrated in FIG. 2, the storage unit 30 and the control unit 40 may be installed in a device such as a server on a cloud connected with the display device including the imaging unit 10 and the display unit 20 via a network or the like.

Note that it is not necessary for the processing described in this specification with reference to the flowchart and the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a display control unit configured to perform a first process of displaying a virtual object superimposed on a real space at a position which is based on a real object detected in the real space or a second process of displaying the virtual object superimposed on the real space at a position which is not based on the real object detected in the real space.

(2)

The information processing apparatus according to (1), in which the display control unit performs switching between the first process and the second process.

(3)

The information processing apparatus according to (2), in which the display control unit performs the switching on the basis of information related to a user and/or information related to the virtual object, (4)

The information processing apparatus according to (3), in which the display control unit performs the switching in accordance with content of the virtual object.)

(5) The information processing apparatus according to (3) or (4), in which the display control unit performs the switching in accordance with a distance between the real object and the user.

(6)

The information processing apparatus according to (1), in which the display control unit changes the display of the virtual object on the basis of a shape of the detected real object in the first process.

(7)

The information processing apparatus according to (6), in which the display control unit changes the display of the virtual object by changing a relative posture of the virtual object with respect to the detected real object and/or by transforming the shape of the virtual object.

(8)

The information processing apparatus according to (6) or (7), in which the display control unit displays the virtual object superimposed on a surface of the detected real object.

(9)

The information processing apparatus according to (8), in which the display control unit displays the virtual object superimposed on a continuous surface among surfaces of the detected real object.

(10)

The information processing apparatus according to (8) or (9), in which the display control unit displays the virtual object superimposed on a surface determined to be horizontal or a surface determined to be vertical among surfaces of the detected real object.

(11)

The information processing apparatus according to any one of (8) to (10), in which the display control unit displays the virtual object superimposed on a position spaced apart from the detected real object.

(12)

The information processing apparatus according to any one of (1) to (11), in which the display control unit displays the virtual object superimposed on a position based on a head of a user or a real space in a line-of-sight direction of the user in the second process.

(13)

The information processing apparatus according to any one of (1) to (11), in which the display control unit displays the virtual object superimposed on an arbitrary position in the real space in the second process.

(14)

The information processing apparatus according to any one of (1) to (13), in which the display control unit controls a position on which the virtual object is superimposedly displayed in accordance with a distance between the real object and a user.

(15)

The information processing apparatus according to any one of (1) to (14), in which the display control unit controls a position on which the virtual object is superimposedly displayed in accordance with an instruction given by a user.

(16)

The information processing apparatus according to any one of (1) to (15), in which the display control unit controls a position on which the virtual object is superimposedly displayed in accordance with a background of a region on which the virtual object is superimposedly displayable and a display form of the virtual object.

(17)

The information processing apparatus according to any one of (1) to (16), in which the display control unit controls a display form of the virtual object in accordance with a background of a region on which the virtual object is superimposedly displayed.

(18)

The information processing apparatus according to any one of (1) to (17), in which the virtual object is a target operated by a user.

(19)

An information processing method including:

performing, by a processor, a first process of displaying a virtual object superimposed on a real space at a position which is based on a real object detected in the real space or a second process of displaying the virtual object superimposed on the real space at a position which is not based on the real object detected in the real space.

(20)

A program causing a computer to function as:

a display control unit configured to perform a first process of displaying a virtual object superimposed on a real space at a position which is based on a real object detected in the real space or a second process of displaying the virtual object superimposed on the real space at a position which is not based on the real object detected in the real space.

REFERENCE SIGNS LIST 1 display device
10 imaging unit
20 display unit
30 storage unit
40 control unit
41 detecting unit
43 storage control unit
45 display control unit
50 mounting unit

The invention claimed is:

1. An information processing apparatus comprising:
 a display control unit configured to
  determine whether a real object having a flat surface with a suitable region to display a virtual object is positioned within a range in accordance with a distance between the real object and a mobile terminal,
  perform, when it is determined that the real object having the flat surface with the suitable region is positioned within the range, a first process of displaying the virtual object, wherein a display of the virtual object is changed and the virtual object is superimposed on a display region within the suitable region of the flat surface of the real object based on a user operation in the first process, and
  perform, when it is determined that the real object does not have the flat surface with the suitable region positioned within the range, a second process of displaying the virtual object superimposed in midair in front of the mobile terminal based on the user operation in the second process,
 wherein the display control unit determines that the real object has the flat surface with the suitable region to display the virtual object based on an area of the suitable region being greater than an area threshold and an angle formed between a normal line of the suitable region and a line-of-sight direction being less than an angular threshold, and
 wherein the display control unit is implemented via at least one processor.

2. The information processing apparatus according to claim 1,
wherein the user operation includes a drag operation.

3. The information processing apparatus according to claim 1,
wherein, in the first process, a shape of the virtual object is transformed.

4. The information processing apparatus according to claim 3,
wherein, in the first process, the virtual object is rotated by the angle formed between the normal line of the suitable region of the flat surface and the line-of-sight direction.

5. The information processing apparatus according to claim 3,
wherein the shape of the virtual object is transformed in accordance with a shape of the flat surface.

6. The information processing apparatus according to claim 1,
wherein the flat surface is a horizontal surface.

7. The information processing apparatus according to claim 1,
wherein, in the first process, the virtual object is superimposed in a same plane region as the flat surface.

8. The information processing apparatus according to claim 1,
wherein, in the first process, the virtual object is superimposed in a plane region that is separated from a plane region of the flat surface.

9. The information processing apparatus according to claim 1,
wherein the display control unit further determines that the real object has the flat surface with the suitable region to display the virtual object based on a color change of the suitable region being less than a color change threshold.

10. An information processing method comprising:
determining whether a real object having a flat surface with a suitable region to display a virtual object is positioned within a range in accordance with a distance between the real object and a mobile terminal;
performing, when it is determined that the real object having the flat surface with the suitable region is positioned within the range, a first process of displaying the virtual object, wherein a display of the virtual object is changed and the virtual object is superimposed on a display region within the suitable region of the flat surface of the real object based on a user operation in the first process; and
performing, when it is determined that the real object does not have the flat surface with the suitable region positioned within the range, a second process of displaying the virtual object superimposed in midair in front of the mobile terminal based on the user operation in the second process,
wherein the real object is determined to have the flat surface with the suitable region to display the virtual object based on an area of the suitable region being greater than an area threshold and an angle formed between a normal line of the suitable region and a line-of-sight direction being less than an angular threshold.

11. A non-transitory computer-readable storage medium having embodied thereon a program, which when executed by a computer causes the computer to execute a method, the method comprising:
determining whether a real object having a flat surface with a suitable region to display a virtual object is positioned within a range in accordance with a distance between the real object and a mobile terminal;
performing, when it is determined that the real object having the flat surface with the suitable region is positioned within the range, a first process of displaying the virtual object, wherein a display of the virtual object is changed and the virtual object is superimposed on a display region within the suitable region of the flat surface of the real object based on a user operation in the first process; and
performing, when it is determined that the real object does not have the flat surface with the suitable region positioned within the range, a second process of displaying the virtual object superimposed in midair in front of the mobile terminal based on the user operation in the second process,
wherein the real object is determined to have the flat surface with the suitable region to display the virtual object based on an area of the suitable region being greater than an area threshold and an angle formed between a normal line of the suitable region and a line-of-sight direction being less than an angular threshold.

* * * * *